United States Patent
Peng et al.

(10) Patent No.: US 7,591,992 B2
(45) Date of Patent: Sep. 22, 2009

(54) HYDROGEN PRODUCTION PROCESS WITH REGENERANT RECYCLE

(75) Inventors: Xiang-Dong Peng, Orefield, PA (US); Shankar Nataraj, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 663 days.

(21) Appl. No.: 11/339,806

(22) Filed: Jan. 25, 2006

(65) Prior Publication Data
US 2007/0172419 A1    Jul. 26, 2007

(51) Int. Cl.
C07C 15/00    (2006.01)

(52) U.S. Cl. .................. 423/650; 423/652; 423/654

(58) Field of Classification Search ........... 423/650, 423/652
See application file for complete search history.

(56) References Cited

U.S. PATENT DOCUMENTS

| | | | |
|---|---|---|---|
| 1,345,905 A | | 7/1920 | Abbott |
| 3,641,182 A | * | 2/1972 | Box, Jr. et al. ............ 585/434 |
| 3,725,493 A | * | 4/1973 | Stine ........................ 585/623 |
| 4,578,089 A | | 3/1986 | Richter et al. |
| 5,055,441 A | | 10/1991 | McCarron, III et al. |
| 5,235,121 A | * | 8/1993 | Brinkmeyer et al. ....... 585/402 |
| 5,827,496 A | | 10/1998 | Lyon |
| 6,007,699 A | | 12/1999 | Cole |
| 6,238,816 B1 | | 5/2001 | Cable et al. |
| 6,322,766 B1 | | 11/2001 | Schicketanz et al. |
| 6,506,510 B1 | | 1/2003 | Sioui et al. |
| 6,682,838 B2 | | 1/2004 | Stevens |
| 6,761,838 B2 | | 7/2004 | Zeng et al. |
| 6,767,530 B2 | | 7/2004 | Kobayashi et al. |
| 6,974,566 B2 | | 12/2005 | Sabacky et al. |
| 7,070,752 B2 | | 7/2006 | Zeng et al. |
| 2002/0010220 A1 | | 1/2002 | Zeng et al. |
| 2002/0071806 A1 | | 6/2002 | Sabacky et al. |
| 2003/0035770 A1 | | 2/2003 | Cole |

(Continued)

FOREIGN PATENT DOCUMENTS

EP    0 411 506 A2    2/1991

(Continued)

OTHER PUBLICATIONS

U.S. Appl. No. 11/165,731, filed Jun. 24, 2005, Pez, et al.

(Continued)

Primary Examiner—Melvin C Mayes
Assistant Examiner—Kenneth Vaden
(74) Attorney, Agent, or Firm—Bryan C. Hoke, Jr.

(57) ABSTRACT

The present invention relates to a process for producing a hydrogen-containing gas. The process comprises introducing a regeneration gas into a hydrogen reaction vessel containing solid packing material thereby at least partially regenerating the solid packing material and forming an effluent gas from the regeneration gas. At least a portion of the effluent gas is introduced into another hydrogen reaction vessel containing solid packing material. The effluent gas may be used, for example, to purge the other hydrogen reaction vessel and/or regenerate the solid packing material in the other hydrogen reaction vessel. Solid packing materials may include at least one of a complex metal oxide, a steam hydrocarbon reforming catalyst, an oxygen ion conducting ceramic, a hydrocarbon partial oxidation catalyst, and a hydrocarbon cracking catalyst.

25 Claims, 9 Drawing Sheets

U.S. PATENT DOCUMENTS

| | | | |
|---|---|---|---|
| 2003/0150163 A1 | 8/2003 | Murata et al. |
| 2003/0229151 A1 | 12/2003 | Hurlburt et al. |
| 2004/0191166 A1 | 9/2004 | Hershkowitz et al. |
| 2005/0112056 A1 | 5/2005 | Hampden-Smith et al. |
| 2005/0229488 A1 | 10/2005 | Stevens |
| 2005/0229490 A1 | 10/2005 | Stevens et al. |
| 2005/0232856 A1 | 10/2005 | Stevens |
| 2007/0172418 A1 | 7/2007 | Slager et al. |

FOREIGN PATENT DOCUMENTS

| | | |
|---|---|---|
| EP | 0 737 648 A2 | 10/1996 |
| EP | 1 134 187 A2 | 9/2001 |
| EP | 1 736 437 A2 | 12/2006 |
| EP | 1 736 438 A2 | 12/2006 |
| EP | 1 816 102 A2 | 8/2007 |
| WO | 99/02471 A1 | 1/1999 |

OTHER PUBLICATIONS

U.S. Appl. No. 11/165,720, filed Jun. 24, 2005, Pez, et al.

A. R. Brun-Tsekhovoi, et al., "The Process of Catalytic Steam-Reforming of Hydrocarbons in the Presence of Carbon Dioxide Acceptor", Hydrogen Energy Progress VII, Proceedings of the $7^{th}$ World Hydrogen Energy Conference, Moscow (vol. 2, 1988), pp. 885-900.

B. Balasubramanian, "Hydrogen from Methane in a Single-Step Process", Chem. Eng. Sci. 54 (1999), 3543-3552.

Y. Ding, "Adsorption-Enhanced Steam Methane Reforming", Chem. Eng. Sci. 55 (2000), pp. 3929-3940.

Waldron, W.E., et al; "Parametric Study of a Pressure Swing Adsorption Process"; Adsorption; vol. 6, 2000; pp. 179-188; XP002464662.

Quinn, et al., U.S. Appl. No. 11/737,942, filed Apr. 20, 2007.

Aihara, M., et al; "Development of Porous Solid Reactant for Thermal-Energy Storage and Temperature Upgrade using Carbonation/Decarbonation Reaction"; Applied Energy; 2001; pp. 225-238.

Kang, Z.C., et al; "Hydrogen Production from Methane and Water by Lattice Oxygen Transfer with Ce0.70Zr0.25Tb0.05O2-x"; Journal of Alloys and Compounds 323-324; 2001; pp. 97-101.

Nakahara, Y., et al; "Synthesis and Crystal Structure of (Sr1-xCax)2FeMnoy(x=0-1.0)"; Elseview Science B.V.; Feb. 1997; pp. 163-167.

Shin; "Separation of a Binary Gas Mixture by Pressure Swing Adsorption: Comparison of Different PSA Cycles"; Adsorption; vol. 1; 1995; pp. 321-333; XP-002464015.

Vidyasagar, K., et al; "A Convenient Route for the Synthesis of Complex Metal Oxides Employing Solid-Solution Precursors"; Inorg. Chem., 23; 1984; pp. 1206-1210.

Hufton, J., et al. "Sorption Enhanced Reaction Process (SERP) for the Production of Hydrogen", Air Products and Chemicals, Inc., Allentown, PA 18195, Proceedings of the 2000 Hydrogen Program Review, NREL/CP-570-28890, pp. 1-12.

\* cited by examiner

FIG. 8

| Vessel | Segment | | | | | | | | | | | | | | | | |
|---|---|---|---|---|---|---|---|---|---|---|---|---|---|---|---|---|---|
| | A | B | C | D | E | F | G | H | I | J | K | L | M | N | O | Q | R |
| 1 | Production | | | | B/D | P | Regen 1 | | | | | | Regen 2 | | | | R |
| 2 | Regen 2 | | | R | Production | | | | B/D | P | Regen 1 | | | | | | |
| 3 | Regen 1 | | | | | | | R | Production | | | Regen 2 | | | | | |
| 4 | B/D | P | Regen 1 | | | | | | | | | R | B/D | P | Production | | |

Key:
P = Purge
BD = Blowdown
R = Repressurization

FIG. 9

| Segment | Open Valves |
|---|---|
| A | 111, 112, 121, 229, 224, 226, 329, 324, 325, 422, 145, 146 |
| B | 111, 112, 121, 229, 224, 226, 329, 324, 325, 423, 427, 146 |
| C | 111, 112, 121, 229, 224, 226, 329, 324, 325, 428, 424, 425, 145 |
| D | 111, 112, 121, 211, 212, 329, 324, 325, 429, 424, 425, 145 |
| E | 122, 211, 212, 221, 329, 324, 326, 429, 424, 425, 145, 146 |
| F | 123, 127, 211, 212, 221, 329, 324, 326, 429, 424, 425, 146 |
| G | 128, 124, 125, 211, 212, 221, 329, 324, 326, 429, 424, 425, 145 |
| H | 129, 124, 125, 211, 212, 221, 311, 312, 429, 424, 425, 145 |
| I | 129, 124, 125, 222, 311, 312, 321, 429, 424, 426, 145, 146 |
| J | 129, 124, 125, 223, 227, 311, 312, 321, 429, 424, 426, 146 |
| K | 129, 124, 125, 228, 224, 225, 311, 312, 321, 429, 424, 426, 145 |
| L | 129, 124, 125, 229, 224, 225, 311, 312, 321, 411, 412, 145 |
| M | 129, 124, 126, 229, 224, 225, 322, 411, 412, 421, 145, 146 |
| N | 129, 124, 126, 229, 224, 225, 323, 327, 411, 412, 421, 146 |
| O | 129, 124, 126, 229, 224, 225, 328, 324, 325, 411, 412, 421, 145 |
| Q | 111, 112, 229, 224, 225, 329, 324, 325, 411, 412, 421, 145 |

HYDROGEN PRODUCTION PROCESS WITH REGENERANT RECYCLE

CROSS-REFERENCE TO RELATED APPLICATIONS

This patent application is related to U.S. patent application Ser. No. 11/339,060, entitled "Regeneration of Complex Metal Oxides for the Production of Hydrogen," contemporaneously filed on 25 Jan. 2006.

BACKGROUND OF THE INVENTION

The production of industrial-scale volumes of hydrogen may be accomplished by application of the steam-methane reforming process, which entails the catalytic reforming of natural gas with steam at elevated temperatures (800-900° C.). This process yields a crude synthesis gas, which is a mixture of hydrogen, carbon monoxide, and carbon dioxide, and the crude synthesis gas is further reacted in a catalytic water-gas shift conversion step to convert carbon monoxide and water to additional hydrogen and carbon dioxide. The shifted synthesis gas is purified to yield a final hydrogen product containing greater than 99 vol % hydrogen.

The natural gas reforming reaction is highly endothermic, requiring about 45 kcal/mole of methane reformed, and the productivity of the steam-methane reforming process is limited by the rate of heat transfer from the external heat source to the catalyst. The catalyst typically is contained in long metal alloy tubes, and the alloy is selected to withstand the elevated temperatures and pressures required by the process. A significant part of the capital cost of the steam-methane reforming process equipment is related to the need for significant heat transfer at the high operating temperatures and pressures.

An alternative process for the production of hydrogen is the partial oxidation of methane to form synthesis gas, which is subsequently shifted if necessary and purified by pressure swing adsorption (PSA). Partial oxidation is known to be highly exothermic. Another alternative process to generate synthesis gas for hydrogen production is autothermal reforming, which is essentially a thermally balanced combination of the steam-methane reforming process and partial oxidation. One considerable drawback associated with these alternative processes is that partial oxidation requires a supply of high purity oxygen gas to the reaction system. Therefore, the use of these processes requires the additional step of separating air to produce the oxygen gas, and the air separation process increases the capital and operating costs of hydrogen production.

Numerous cyclic methods for the production of hydrogen gas are known in the art. One method entails the reaction of metal oxides with steam and methane. U.S. Pat. No. 6,761,838 describes the production of hydrogen and carbon monoxide by the partial oxidation and/or steam reforming of hydrocarbons in an autothermal process. The publication further discloses the use of an oxygen ion conducting, particulate ceramic in a cyclic process which involves the reaction of oxygen in the air feed with the ceramic in one (regeneration) step, and the reaction of hydrocarbon feed and, optionally, steam, with the oxygen-enriched ceramic produced in the first step, to produce hydrogen and carbon monoxide (hydrogen production step). Preferred ceramic materials are stated to include perovskite substances.

Investigations of the catalytic steam-methane reforming reaction have been carried out in systems which contain carbon dioxide acceptors to yield a higher-purity hydrogen rich product. For example, the use of calcium oxide, a carbon dioxide acceptor which is converted to calcium carbonate by chemisorption of the carbon dioxide, is disclosed in "The Process of Catalytic Steam-Reforming of Hydrocarbons in the Presence of Carbon Dioxide Acceptor," A. R. Brun-Tsekhovoi et al., *Hydrogen Energy Progress VII*, Proceedings of the 7$^{th}$ World Hydrogen Energy Conference, Moscow, Vol. 2, pp. 885-900 (1988). The use of calcium oxide as a carbon dioxide acceptor in the steam-methane reforming reaction is also disclosed in "Hydrogen from Methane in a Single-Step Process," B. Balasubramanian et al., *Chem. Eng. Sci.* 54 (1999), 3543-3552. Hydrotalcite-based carbon dioxide adsorbents are disclosed in "Adsorption-enhanced Steam-Methane Reforming," Y. Ding et al., *Chem. Eng. Sci.* 55 (2000), 3929-3940.

U.S. Pat. No. 5,827,496 discloses a process for carrying out an endothermic reaction, such as the reforming petroleum hydrocarbons, within a packed bed reactor using an unmixed combustion catalytic material and a heat receiver. The catalytic materials are referred to as "mass-transfer catalysts," and include metal/metal oxide combinations such as nickel/nickel oxide, silver/silver oxide, copper/copper oxide, cobalt/cobalt oxide, tungsten/tungsten oxide, manganese/manganese oxide, molybdenum/molybdenum oxide, strontium sulfide/strontium sulfate, barium sulfide/barium sulfate, and mixtures thereof. The heat receiver may also include a $CO_2$ sorbent material, which is essentially limited to calcium oxide or a source thereof. This patent, in the context of its disclosed general process for heat transfer by "unmixed combustion," describes a process for reforming petroleum hydrocarbons with steam. The process includes thermal regeneration and $CO_2$ sorbent regeneration.

U.S. Pat. No. 6,007,699 also discloses an "unmixed combustion" method that utilizes a combination of physical mixtures of metal oxides, a heat receiver and a catalyst comprising one or more metal/metal oxide combinations. Examples of the heat receiver include $CaCO_3$, boiling water, a reforming reaction in a combustion system, a catalyst system requiring regeneration, and an adsorbent or absorbent material during regeneration. Calcium oxide is used to remove carbon dioxide and drive the equilibrium reaction towards the production of hydrogen. In an embodiment, heat is supplied to a packed bed of a sorbent to thermally regenerate the sorbent.

U.S. Pat. No. 6,682,838 discloses a method for converting hydrocarbon fuel to hydrogen-rich gas by reacting the hydrocarbon feed with steam in the presence of a reforming catalyst and a carbon dioxide fixing material, removing carbon monoxide from the hydrogen gas product by methanation or selective oxidation, and regenerating the carbon dioxide fixing material by heating it to at least 600° C. Suitable disclosed carbon dioxide fixing materials include calcium oxide, calcium hydroxide, strontium oxide, strontium hydroxide, and other mineral compounds containing Group II elements.

U.S. Pat. No. 6,767,530 to Kobayashi et al. describes a method for producing hydrogen wherein steam and methane are reacted to produce synthesis gas from which hydrogen is recovered, and heat employed in the process is recovered using a defined regenerative bed system.

United States Patent Application Publication No. 2004/0191166 by Hershkowitz et al. describes a method for generating high pressure hydrogen. A synthesis gas stream is produced in a pressure swing reformer. The synthesis gas is subjected to a high temperature water gas shift process to produce a hydrogen enriched stream. Specific embodiments of the process include regenerating the reformer at a pressure lower than the synthesis gas generation.

U.S. Pat. No. 6,506,510 to Sioui et al., describes an integrated system for the co-production of heat and electricity for residences or commercial buildings based on the cracking of hydrocarbons to generate hydrogen for a fuel cell. The cracking reaction is coupled with an air or steam regeneration cycle to reactivate the cracking catalyst for further use. This regeneration can provide a valuable source of heat or furnace fuel to the system.

As described above, many cyclic processes practiced or proposed for the commercial production of hydrogen gas and/or synthesis gas include a hydrogen production step where material in the hydrogen reaction vessel is degraded and a regeneration step where the material is regenerated for a subsequent hydrogen production step.

It would be desirable to improve the thermal efficiency of hydrogen production processes having a regeneration step. The regeneration effluent gas from one reactor in a plurality of reactors in the prior art process is fed to either a heat recovery system or a gas turbine to recover its energy. While a major portion of the energy in this gas stream is recovered this way, there is still a significant portion of the energy that is lost as low level heat because the spent regeneration effluent gas has to be discharged from the plant at a greater than ambient temperature (typically greater than 250° F.). This energy loss in the form of low level heat is very similar to the energy loss in the flue gas when it leaves the stack at a conventional steam hydrocarbon reforming (SMR) hydrogen plant. It would be desirable to reduce the amount of flue gas generated from the regeneration step, thereby improving the thermal efficiency of the process.

Many of the hydrogen production processes described above also include one or more purge steps. It would also be desirable to provide any necessary purge steps with existing available gas streams without the need to generate additional steam, carbon dioxide, or importing inert gases.

It would be desirable to produce hydrogen-containing gas and be able to tolerate carbon deposition within the hydrogen reaction vessel. It would be desirable to benefit from carbon deposition within the hydrogen reaction vessel.

It would be desirable to produce hydrogen-containing gas without a pre-reformer.

It would be desirable to produce hydrogen-containing gas using sulfur-containing fuels without a sulfur removal system for removing sulfur from the fuel.

Known processes for the generation of hydrogen gas from hydrocarbons thus have associated drawbacks and limitations due to the highly endothermic nature of the hydrocarbon steam reforming reactions, feedstock purification, and the requirement of an oxygen supply for the partial oxidation of hydrocarbons used in autothermal reforming. There is a need in the field of hydrogen generation for improved process technology for the generation of hydrogen gas by the reaction of methane or other hydrocarbons with steam without certain of the limitations associated with known processes. This need is addressed by the embodiments of the present invention described below and defined by the claims that follow.

BRIEF SUMMARY OF THE INVENTION

The present invention relates to a process for producing a hydrogen-containing gas. The process comprises introducing a regeneration gas into a hydrogen reaction vessel containing solid packing material thereby at least partially regenerating the solid packing material and forming an effluent gas from the regeneration gas. At least a portion of the effluent gas is introduced into another hydrogen reaction vessel containing solid packing material. The effluent gas may be used, for example, to purge the other hydrogen reaction vessel and/or regenerate the solid packing material in the other hydrogen reaction vessel.

The process may further comprise introducing feed gas into one or more hydrogen reaction vessels. The feed gas comprises at least one hydrocarbon. The hydrocarbon feed reacts with other constituents thereby generating product gas comprising hydrogen, which is withdrawn from the hydrogen reaction vessel. During the reaction, the solid packing material is at least partially degraded.

In an embodiment of the present invention, the feed gas comprises at least 50 ppbv sulfur. Sulfur is deposited on the solid packing material in one or more of the hydrogen reaction vessels during the step of introducing feed gas. Subsequently, sulfur is removed from the solid packing material by reacting the sulfur with regeneration gas to form $SO_2$.

In another embodiment of the present invention, solid packing material is at least partially degraded by carbon deposition. Regeneration comprises removing the deposited carbon by reacting regeneration gas with the deposited carbon to form carbon dioxide.

BRIEF DESCRIPTION OF SEVERAL VIEWS OF THE DRAWINGS

FIG. 8 is a cycle schedule for a system having four reaction vessels.

FIG. 9 is a summary of open valves corresponding to the cycle schedule in FIG. 8.

DETAILED DESCRIPTION OF THE INVENTION

Figure 1:
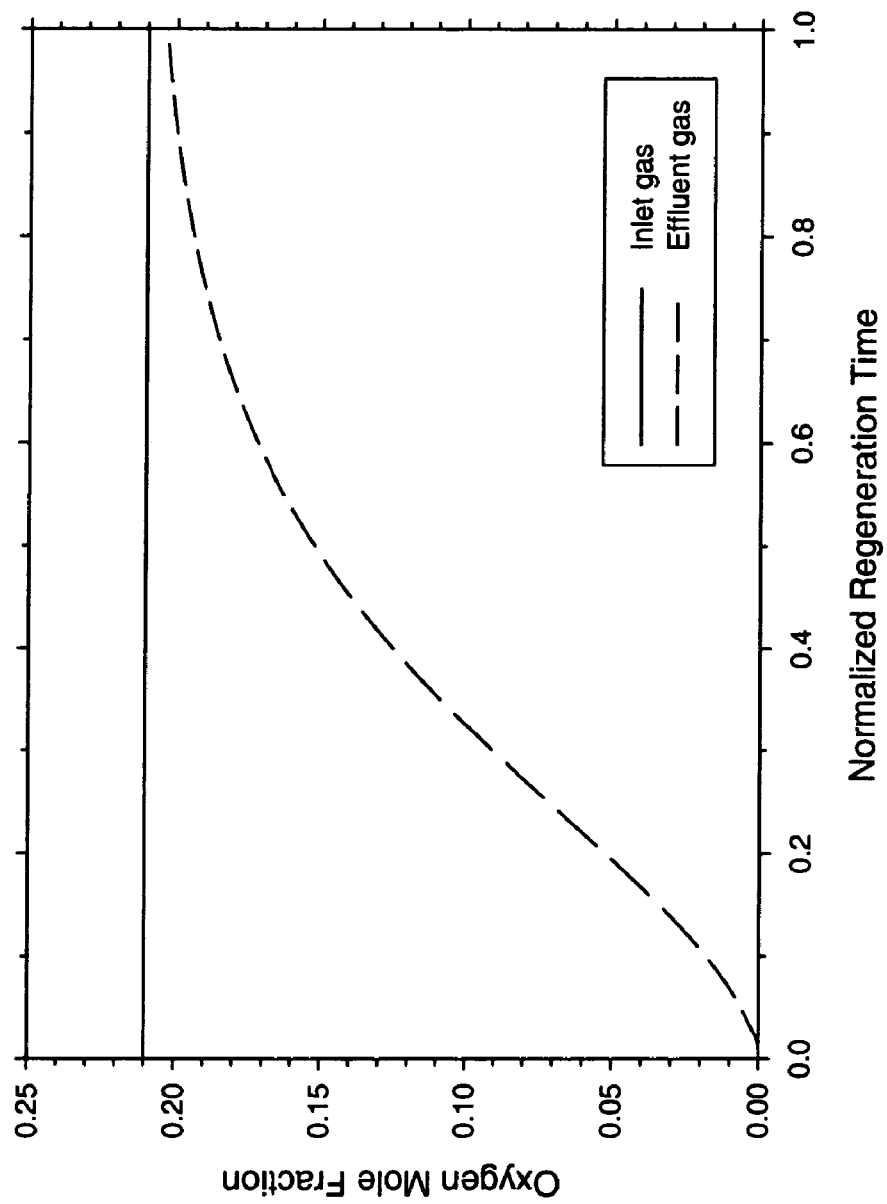
FIG. 1 is a plot of oxygen mole fraction versus normalized regeneration time for a simulation of metal oxide regeneration using fresh regeneration gas throughout the regeneration step.

The present invention is related to a process for producing a hydrogen-containing gas. The present invention is directed to cyclic hydrogen production technologies having a regeneration step.

The present invention is especially useful for cyclic processes having a plurality of vessels. The vessels may be in different stages of the cyclic process thereby allowing continuous production of the hydrogen-containing gas.

The present inventive process comprises introducing a regeneration gas into a hydrogen reaction vessel containing a solid packing material thereby at least partially regenerating the solid packing material, forming an effluent gas from the regeneration gas, and introducing at least a portion of the effluent gas into another hydrogen reaction vessel containing a solid packing material.

A hydrogen reaction vessel is defined herein as any vessel wherein hydrogen is formed from a hydrocarbon feedstock. Other gases may also be formed in the vessel, for example, carbon monoxide, and carbon dioxide.

Solid packing materials for hydrogen production are known in the art. The solid packing material may comprise at least one of a complex metal oxide, an oxygen ion conducting ceramic, a hydrocarbon partial oxidation catalyst, a steam hydrocarbon reforming catalyst, a hydrocarbon cracking catalyst, a carbon dioxide fixing material, and a refractory solid for regenerative heat exchange. The solid packing material may be pellet type or structured monolithic type.

The solid packing material may include a mixture of a steam reforming catalyst and a complex metal oxide that can fix or retain carbon dioxide and cycle between different oxidation states of its metal components. The solid packing material may include a mixture of a segregated combustion catalytic material and a heat receiver as described in U.S. Pat. No. 5,827,496 to Lyon. The solid packing material may include a mixture of a reforming catalyst and a carbon dioxide fixing material as described in U.S. Pat. No. 6,682,838 to Stevens. The solid packing material may include a mixture of a reforming catalyst and heat-cycling regenerative solids as described in U.S. patent application Ser. No. 10/771,919 by Hershkowitz et al. and U.S. Pat. No. 6,767,530 to Kobayashi et al. The solid packing material may include a mixture of oxygen ion conducting ceramic and a reforming catalyst and/or partial oxidation catalyst as described in U.S. Pat. No. 6,761,838 to Zeng et al. The solid packing material may comprise a hydrocarbon cracking catalyst, like that described in U.S. Pat. No. 6,506,510 to Sioui et al., for example.

The above solid packing materials share a common attribute in that they need to be regenerated following the hydrogen production step. The solid packing materials need to be regenerated for one or more of the following reasons: the metal oxide material or catalyst has been reduced to a low oxidation state that can no longer be used for reaction, the catalyst has reduced activity through carbon deposition, the carbon dioxide fixing material has been saturated with carbon dioxide, the temperature of the reaction vessel has dropped too low for satisfactory rate of reaction due to the endothermicity of reaction.

Regeneration gas is introduced into the reaction vessel, which contains solid packing material, to at least partially regenerate the solid packing material. The solid packing material may be fully or only partially regenerated by the regeneration gas. A regeneration gas is any gas that affects a regeneration of a solid packing material. Regeneration may be, for example, in the form of changing the temperature, changing the oxidation state, species adsorption, species desorption, removal and/or reaction of deposited species, or increasing catalytic activity. Regeneration could be recovery of the activity of a catalyst, restoration of the capacity of a sorbent, and/or restoration of the reactor bed temperature.

According to an embodiment of the present invention, regeneration gas introduced to a reaction vessel may vary during the regeneration step. The source and/or composition of the regeneration gas may vary as a function of time. The composition of the regeneration gas may change and/or the source of the regeneration gas may change. Regeneration gas may be effluent gas from another vessel undergoing regeneration, fresh regeneration gas, or a blend of effluent gas and fresh regeneration gas. Fresh regeneration gas is fresh in the sense that it has not previously passed through a reaction vessel to affect regeneration of a solid packing material. The regeneration gas may, during an early part of the regeneration step, be effluent from another reaction vessel undergoing regeneration, and then change over to fresh regeneration gas later in the regeneration step.

For the case where the solid packing material comprises a complex metal oxide, the regeneration gas may be an oxygen-containing gas, for example air, to affect the oxidation state of the metal oxide. The regeneration gas may at the same time also desorb carbon dioxide. The oxygen reacts with the reduced metal to restore the complex metal oxide to its desired state for reaction. The air may be externally preheated to a regeneration temperature in a heat exchanger or by combustion with a fuel in a direct-fired heater. The regeneration of the complex metal oxide may take place spontaneously with minimal input or loss of heat, and may be effected at temperatures in the range of about 450° C. to about 900° C. or in the range of about 600° C. to about 800° C.

As described in U.S. Pat. No. 6,761,838 to Zeng et al., for the case where the solid packing material comprises an oxygen ion conducting ceramic, the regeneration gas may be a high-temperature, oxygen-containing gas. Zeng et al. describe a hydrogen production process wherein the solid packing material comprises an oxygen ion conducting ceramic. Whilst Zeng et al. describe the hydrogen production or reaction step as the regeneration step, and the production of oxygen-enriched oxygen ion conducting ceramic as the reaction step, in this disclosure, the reaction step refers to the hydrogen production step and the regeneration step refers to the production of oxygen-enriched ceramic. This provides consistency when comparing and relating different hydrogen production technologies discussed herein.

The oxygen-containing gas reacts with an oxygen ion conducting ceramic at high temperatures. The heat produced during the step of regenerating the oxygen ion conducting ceramic with oxygen provides a high temperature environment for the partial oxidation process in the hydrogen production reaction step. The oxygen from an oxygen-containing gas reacts with the oxygen ion conducting ceramic and produces an oxygen-enriched ceramic by dissociating oxygen molecules into oxygen ions and incorporating these oxygen ions into the lattice structure of the ceramic. As per Zeng et al., by "oxygen-containing gas" it is meant a gas that contains elemental oxygen. The oxygen-containing gas may be, for example, substantially pure oxygen or an oxygen-gas mixture, such as, oxygen-nitrogen mixtures, oxygen-argon mixtures, oxygen-nitrogen-argon mixtures, air, oxygen-carbon dioxide mixtures, oxygen-carbon monoxide mixtures, etc. The preferred oxygen-containing gas is air, because of its low cost and availability. The oxygen-containing gas can also be a gas containing molecularly bound oxygen, such as, for example, steam, $CO_2$, $SO_2$, $NO_x$, $SO_x$, and combinations thereof. Preferred among these are steam and $CO_2$. In this case, oxygen is extracted from the molecule, such as from $H_2O$ or $CO_2$, producing $H_2$ or $CO$ in the process as additional useful by-products.

As described in U.S. Pat. No. 6,682,838 to Stevens, for the case where the solid packing material comprises a carbon dioxide fixing material, the carbon dioxide fixing material may be regenerated by heating it to greater than 600° C. The regeneration gas may comprise steam. The regeneration gas may be a high-temperature, carbon dioxide lean stream for desorbing the carbon dioxide.

For the case where the solid packing material comprises heat-cycling regenerative solids that are regenerated thermally, the regeneration gas may comprise hot product gases, and/or products of combustion. As discussed in U.S. Pat. No. 6,767,530 to Kobayashi et al., where the solid packing material also typically comprises steam hydrocarbon reforming catalyst, the solid packing materials are reheated by hot combustion gas. The restoration/regeneration of the reactor temperature may also be accomplished by introducing oxygen-containing gas along with a fuel. The oxygen-containing gas may be premixed with the fuel or introduced separately into the reactor vessel. The oxygen reacts with the fuel in the vessel to generate heat and combustion products. The oxygen-containing gas and a fuel may be introduced to a separate vessel, a combustor or furnace, to generate a hot gas which is then fed to the reaction vessel containing the solid packing material to heat the vessel and its contents to the desired reaction temperature. If the system also contains a carbon dioxide fixing component, the heat generation and gas flow will remove carbon dioxide from the reaction vessel, restoring the carbon dioxide fixing capacity.

For the case where carbon is deposited on the solid packing material, as for example may occur when the solid packing material comprises a hydrocarbon cracking catalyst, the regeneration gas may be an oxygen-containing gas to react with deposited carbon to restore the catalyst and generate heat that heats the reaction vessel and its contents to the desired reaction temperature. As described in U.S. Pat. No. 6,506,510 to Sioui et al., it is also possible to use steam or a water-containing stream as the regeneration gas.

While the regeneration gas is at least partially regenerating the solid packing material, the regeneration gas will be changed in some way. For example, the regeneration gas may be cooled or oxygen may be consumed and/or removed, or carbon dioxide may be introduced to the regeneration gas. The resulting gas exiting or removed during regeneration is regeneration effluent gas, or simply "effluent gas."

The present invention relates to a process scheme where at least a portion of the effluent gas from regenerating the solid packing material is introduced into a second hydrogen reaction vessel containing solid packing material. The present invention is based on the discovery that the effluent from the vessel during regeneration may be suitable for introducing to other vessels to affect positive benefits, for example, regeneration of the solid packing material and/or purging of combustible gases in the other vessels. The regeneration gas introduced to the second hydrogen reaction vessel may comprise the effluent gas during only a portion of the regeneration step. For example, the regeneration gas may comprise effluent gas only during the early part of the regeneration step. Later in the regeneration step, the regeneration gas may come from another source and have a different composition. The regeneration gas introduced to the second hydrogen reaction vessel may comprise effluent gas during most or the entire regeneration step and may be a blend of the effluent and another gas. The prior art does not disclose using regeneration effluent gas from one reaction vessel to regenerate solid packing material in another reaction vessel or to provide purge gas to another reaction vessel.

FIG. 1 illustrates results from a simulation of regenerating a complex metal oxide solid packing material. The oxygen mole fraction of the gas entering and gas exiting the vessel is plotted as a function of the normalized regeneration time. Initially all of the redox sites in the metal oxide are in a reduced state. In this example, the inlet regeneration gas during the entire regeneration is air having an oxygen mole fraction of 0.21. As shown in FIG. 1, initially the oxygen mole fraction in the effluent gas is about 0 as nearly all of the oxygen is consumed in the vessel. As time progresses, oxygen breaks through the bed and exits the vessel with gradually increasing concentration. Near the end of the regeneration step, the effluent gas oxygen mole fraction is about 0.20. According to the simulation, about 98.4% of the metal oxide is regenerated according to this regeneration scheme using air.

The general shape of the oxygen mole fraction curve for the effluent gas in FIG. 1 is characteristic. It is well-known in the theory of fixed-bed reactors or adsorbers that the concentration of a species in the effluent gas, originally contained in the feed gas, and consumed by the reactor or adsorber is initially at a low plateau value, followed by a gradual increase to a final plateau value. This may be described as an S-curve. The oxygen concentration is low during the early part of the regeneration step because the regeneration gas passes through a greater amount of reduced metal oxide, providing more opportunity for the oxygen to be completely consumed by the reactions associated with regenerating the metal oxide. As the metal oxide gets regenerated in a progressing "wave" or "front" from the feed end, the portion of the vessel having reduced metal oxide is progressively decreased. Over time, the regeneration gas passes through a lesser amount of reduced metal oxide, resulting in higher and higher unconverted oxygen in the effluent gas. The result is similar for other solid packing materials (e.g. reduced catalyst, deposited carbon, etc.).

Figure 2:
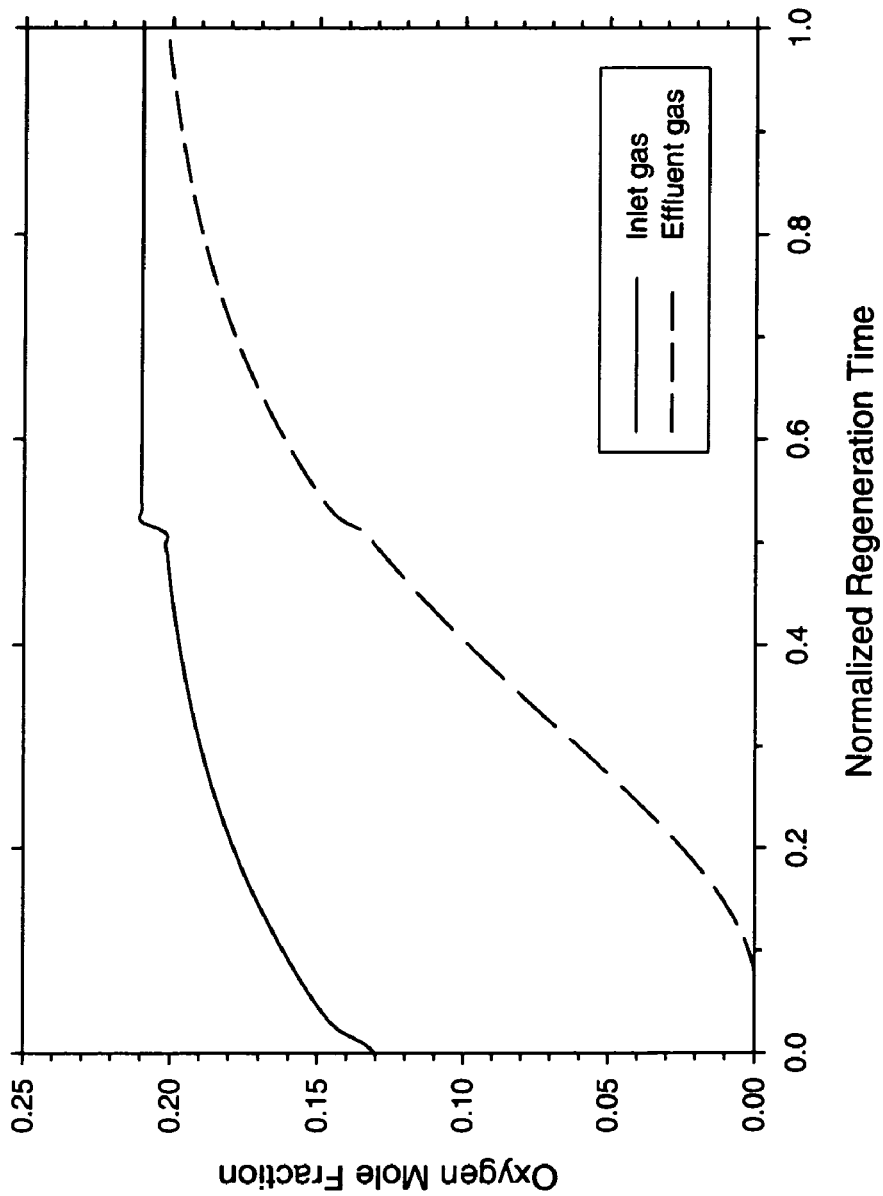
FIG. 2 is a plot of oxygen mole fraction versus normalized regeneration time for a simulation of metal oxide regeneration according to an embodiment of the present invention.

FIG. 2 illustrates results from a simulation of regenerating a complex metal oxide solid packing material according to an embodiment of the present invention. The oxygen mole fraction of the gas entering and the gas exiting the vessel is plotted as a function of the normalized regeneration time. Initially all of the redox sites in the metal oxide are in a reduced state. In this example, regeneration is conducted in two equal intervals. In the first interval, normalized regeneration time from 0 to 0.5, the regeneration gas entering the vessel is effluent from another vessel in its second interval of the regeneration step. Oxygen contained in the effluent gas from one hydrogen reaction vessel is further consumed in a second reaction vessel. The oxygen mole fraction of the inlet regeneration gas is slowly increasing from about 0.13 up to about 0.20 in the first interval. In the second interval, normalized regeneration time from 0.5 to 1, fresh regeneration gas, i.e. air, is used as the regeneration gas. The oxygen mole fraction of the inlet regeneration gas is 0.21 during the entire second interval.

As shown in FIG. 2, initially the oxygen mole fraction in the effluent gas is about 0 as nearly all of the oxygen is consumed in the vessel. As time progresses, oxygen breaks through the bed and exits the vessel with gradually increasing concentration. Near the end of the regeneration step, the effluent gas oxygen mole fraction is about 0.20. According to the simulation, about 97.9% of the metal oxide is regenerated via this regeneration scheme using effluent gas, compared to 98.4% for the case where fresh air is used during the entire regeneration step. According to the simulation, and discovered by the inventors, the oxygen concentration in the effluent gas during a later stage of regeneration has sufficient driving force for affecting regeneration in another vessel during its early stage of regeneration. Regeneration using effluent gas decreases the overall usage of the fresh regeneration gas. In this example, only half the amount of fresh regeneration gas is required when effluent gas from another vessel is used for regeneration. Consequently, half the amount of flue gas is produced, resulting in improved system efficiency, with little impact on the extent of regeneration of the complex metal oxide.

Figure 3:
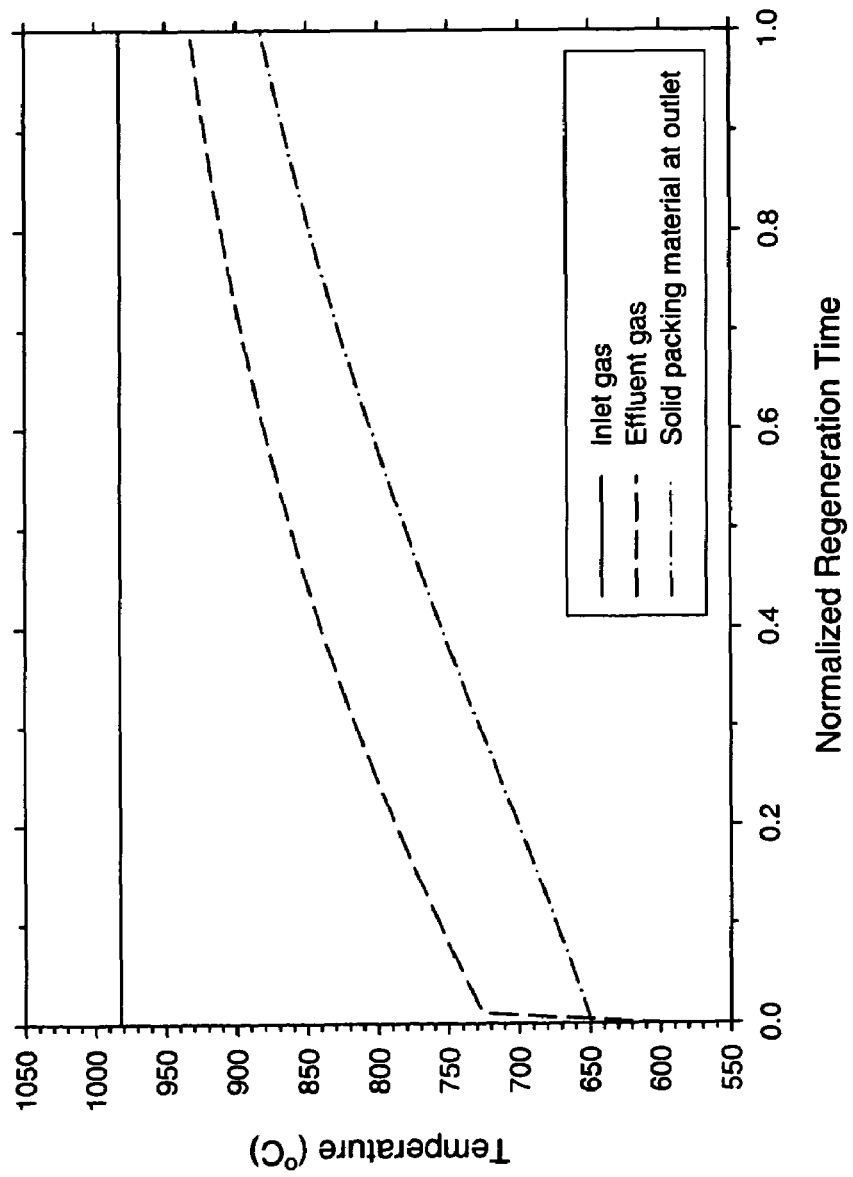
FIG. 3 is a plot of temperature versus normalized regeneration time for a simulation of temperature regeneration of a solid packing material using constant high temperature regeneration gas.

In some hydrogen production processes, regeneration may be affected by temperature in addition to oxygen or instead of oxygen. A trend similar to the oxygen concentration in the effluent gas as a function of regeneration time may occur for the temperature of the effluent gas as a function of regeneration time as illustrated in FIG. 3. For example, hydrogen production processes having heat-cycling regenerative solids may exhibit a trend where the effluent gas temperature is initially low and increases during the regeneration step.

FIG. 3 illustrates a simulation where solid packing material in a vessel is heated by hot regeneration gas. The initial temperature of the solid packing material throughout the vessel is assumed to be 650° C. (1200° F.). The initial temperature of the gas in the vessel is assumed to be at 593° C. (1101° F.). In this example, the inlet gas is introduced at a constant temperature of 982° C. (1800° F.) throughout the regeneration period. Since the volumetric mean residence time is small, the effluent gas temperature jumps quickly to about 723° C. (1334° F.) and then steadily increases to about 933° C. (1711° F.). The temperature of the solid packing material at the exit of the vessel increases from about 650° C. (1200° F.) to about 883° C. (1621° F.).

Figure 4:
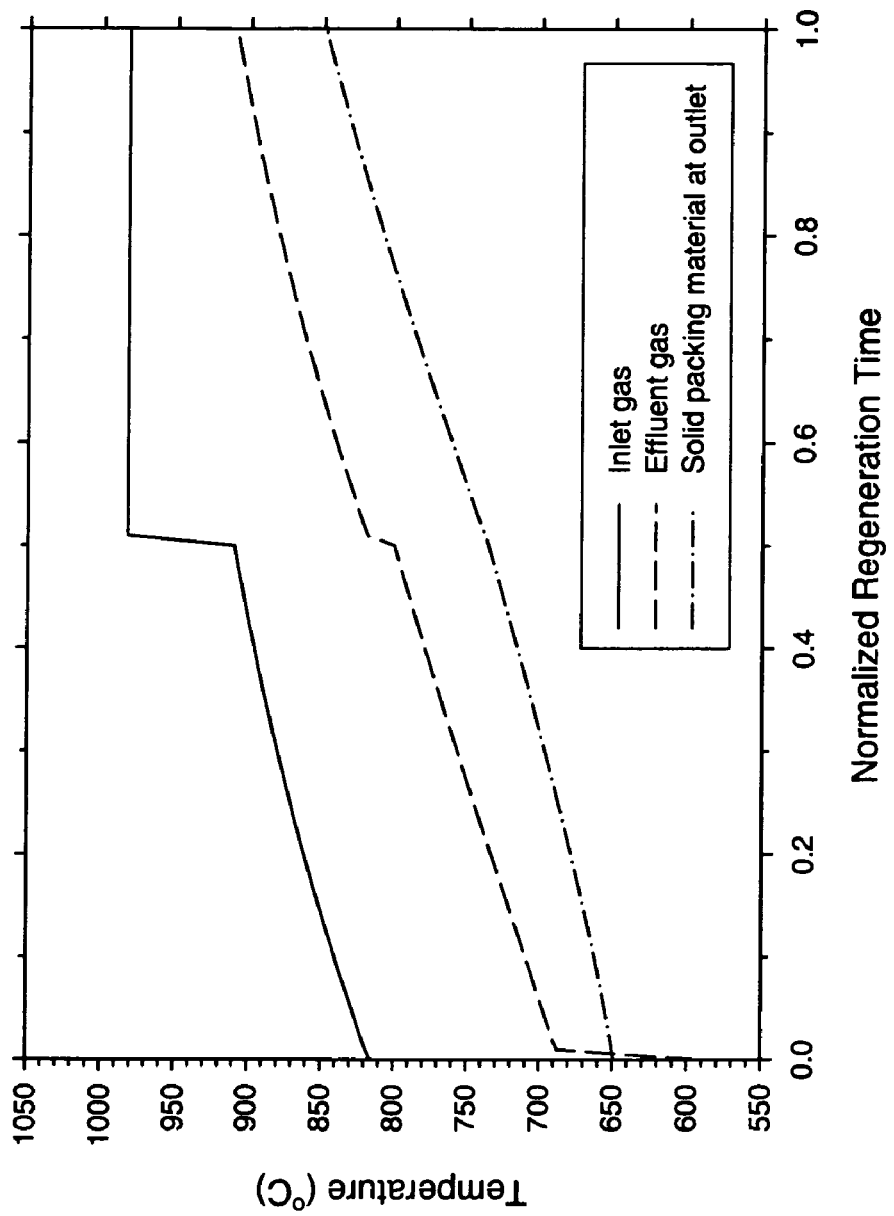
FIG. 4 is a plot of temperature versus normalized regeneration time for a simulation of temperature regeneration of a solid packing material according to an embodiment of the present invention.

For the simulation results shown in FIG. 4, temperature regeneration is conducted in two equal intervals in a manner consistent with an embodiment of the present invention. In the first interval, normalized regeneration time from 0 to 0.5, the regeneration gas entering the vessel is effluent from another vessel in its second interval of the regeneration step. As shown in FIG. 4, and discovered by the inventors, the temperature of the effluent gas in the later stages of regeneration has sufficient driving force for affecting regeneration in another vessel during its early stage of regeneration. Heat contained in the effluent gas from one hydrogen reaction vessel is used to raise the temperature in a second reaction vessel. The temperature of the inlet regeneration gas is slowly increasing from about 815° C. (1499° F.) up to about 910° C. (1670° F.) in the first interval. In the second interval, normalized regeneration time from 0.5 to 1, the temperature of the inlet regeneration gas is a constant 982° C. (1800° F.) during the entire interval.

As shown in FIG. 4, initially the temperature of the effluent gas quickly jumps to about 687° C. and increases to about 800° C. in the first interval. During the second interval, the effluent gas temperature increases further up to about 910° C. (° F.). The temperature of the solid packing material at the exit of the vessel increases from about 650° C. (1200° F.) to about 850° C. (1562° F.), compared to a final exit temperature of about 883° C. (1621° F.) for the case where 982° C. (1800° F.), constant temperature regeneration gas was used. Regeneration using effluent gas decreases the overall usage of the fresh regeneration gas. In this example, only half the amount of fresh regeneration gas is required when effluent gas from another vessel is used for regeneration. Consequently, half the amount of flue gas is produced, resulting in improved system efficiency, with little impact on the extent of temperature regeneration.

Alternatively to heating the solid packing material with a constant temperature gas, in an embodiment of the invention, the temperature of the solid packing material may be increased using combustion energy from a fuel and an oxygen source gas. The fuel and oxidant may be reacted in the reaction vessel or in a combustor upstream of the reaction vessel. The fuel and oxidant may be premixed and/or introduced separately.

The amount of oxidant (air) relative to the amount fuel may be controlled. If the oxidant/fuel ratio is stoichiometric, flame temperatures in excess of 3000° F. may occur, which could damage reactor components. Thus an amount of air in sufficient excess relative to stoichiometric combustion in order to limit the flame temperature, yet provide a sufficient temperature driving force to regenerate the bed may be used. In cases where oxygen is not depleted by regeneration, the large residual oxygen concentration in the effluent gas remains unchanged as it regenerates (heats) the bed. According to an embodiment of the present invention, the thermal efficiency of the process may be increased by using the effluent gas as an oxidant gas in another reaction vessel that needs to be regenerated along with additional fuel.

In an embodiment of the invention, the regeneration gas comprises oxygen, and the process further comprises introducing a complementary regeneration gas comprising fuel, and reacting at least a portion of the fuel with only a portion of the oxygen in the regeneration gas thereby heating the solid packing material thereby at least partially regenerating the solid packing material and forming effluent gas comprising unreacted oxygen from the regeneration gas. The process may further comprise introducing a another complementary regeneration gas comprising fuel into another hydrogen reaction vessel, and reacting at least a portion of the fuel with at least a portion of the unreacted oxygen introduced into the other hydrogen reaction vessel thereby heating the solid packing material in the other reaction vessel thereby at least partially regenerating the solid packing material in the other reaction vessel. The fuel in the various complementary regeneration gases may be the same or different.

This kind of scheme is well suited to the pressure swing reforming process of Hershkowitz (U.S. Pat. Appl. Pub. 2004/0191166), which uses a bed of thermally regenerable inerts solids, with end zones that function as regenerative heat exchangers to heat up gas flow entering the vessel prior to its contact with the bed, or cool down the gas flow exiting the bed prior to exiting the reactor vessel.

Additionally or alternatively, unconverted oxygen in the regeneration effluent may be used to combust a fuel, for example, in a package boiler to raise steam. Using this stream in lieu of fresh air may raise the efficiency of the overall process. This oxygen-containing stream may be the effluent from the late stage of the regeneration step or from the entire duration of the regeneration step.

Another type of regeneration relates to reaction systems that contain a carbon dioxide fixing solid. After the carbon dioxide retaining capacity is reduced or exhausted during the hydrogen production or reaction step, a regeneration gas with no or low carbon dioxide content is introduced into the reaction vessel to desorb carbon dioxide from the carbon dioxide fixing solid, thereby restoring its carbon dioxide retaining capacity. This step may require a large amount of regeneration gas to lower the carbon dioxide partial pressure in the vessel. Sometimes release of carbon dioxide from the carbon dioxide fixing solid is affected by temperature. For example, the carbon dioxide fixing solid may release carbon dioxide at elevated temperature. Consequently, the regeneration gas may comprise a high temperature gas or the reaction vessel may be heated by the exothermic reactions (e.g., fuel combustion, metal oxidation) in the vessel.

Figure 5:
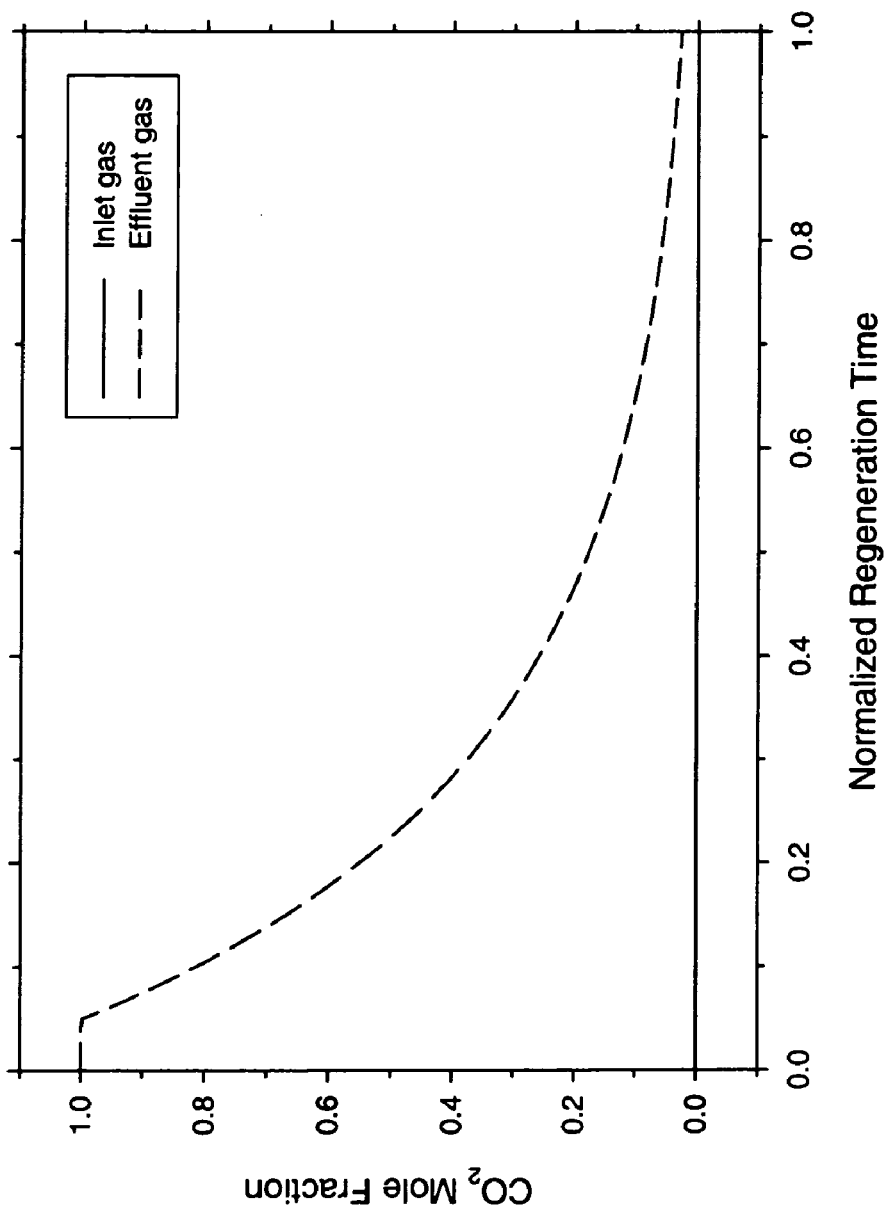
FIG. 5 is a plot of carbon dioxide mole fraction versus normalized regeneration time for a simulation of carbon dioxide desorption regeneration using fresh regeneration gas throughout the regeneration step.

FIG. 5 illustrates results from a simulation of carbon dioxide desorption. The carbon dioxide mole fraction of the gas entering and gas exiting the vessel is plotted as a function of the normalized regeneration time. Initially all of the carbon dioxide adsorbing sites are saturated with carbon dioxide. In this example, the inlet regeneration gas during the entire regeneration has a carbon dioxide mole fraction of 0. As shown in FIG. 5, initially the carbon dioxide mole fraction in the effluent gas is about 1 as the carbon dioxide desorbs. As time progresses, desorption slows and the carbon dioxide-free regeneration gas breaks through the bed and exits the vessel. Near the end of the regeneration step, the effluent gas carbon dioxide mole fraction is about 0.03. According to the simulation, about 97.8% of the carbon dioxide adsorbing sites will be regenerated.

Figure 6:
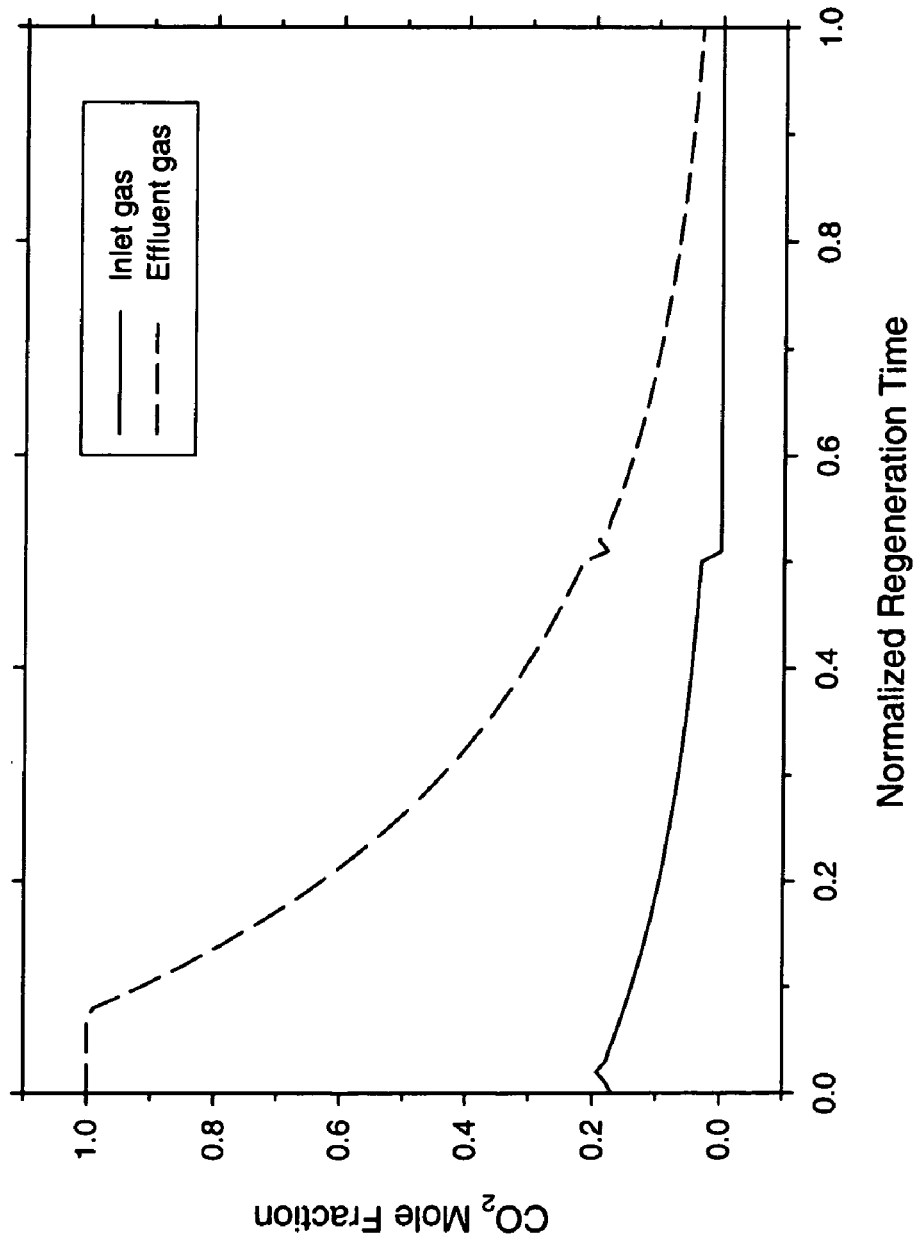
FIG. 6 is a plot of carbon dioxide mole fraction versus normalized regeneration time for a simulation of carbon dioxide desorption regeneration according to an embodiment of the present invention.

FIG. 6 illustrates results from a simulation of regenerating carbon dioxide adsorbent solid packing material according to an embodiment of the present invention. The carbon dioxide mole fraction of the gas entering and the gas exiting the vessel is plotted as a function of the normalized regeneration time. Initially all of the carbon dioxide adsorbing sites are saturated with carbon dioxide. In this example, regeneration is conducted in two equal intervals. In the first interval, normalized regeneration time from 0 to 0.5, the regeneration gas entering the vessel is effluent from another vessel in its second interval of the regeneration step. Effluent gas having a low concentration of carbon dioxide is used to desorb carbon dioxide in a second reaction vessel. The carbon dioxide mole fraction of the inlet regeneration gas is slowly decreasing from about 0.18 down to about 0.03 in the first interval. In the second interval, normalized regeneration time from 0.5 to 1, fresh regeneration gas, which is carbon dioxide-free, is used as the regeneration gas.

As shown in FIG. 6, initially the carbon dioxide mole fraction in the effluent gas is about 1. As time progresses, carbon dioxide is diluted by the regeneration gas and less carbon dioxide is desorbed resulting in a decrease in the carbon dioxide mole fraction. At the end of the first interval, the carbon dioxide mole fraction is about 0.2. By the end of the second interval, the carbon dioxide mole fraction is further reduced to about 0.03. According to the simulation, about 97.5% of the carbon dioxide adsorbing sites will be regenerated, compared to 97.8% for the case where carbon dioxide-free regeneration gas is used throughout the regeneration step. According to the simulation, and discovered by the inventors, the effluent gas from a later stage of regeneration has sufficient driving force for affecting regeneration (carbon dioxide desorption) in another vessel during its early stage of regeneration. Regeneration using effluent gas decreases the overall usage of the fresh regeneration gas. In this example, only half the amount of fresh regeneration gas is required when effluent gas from another vessel is used for regeneration. Consequently, half the amount of flue gas is produced, resulting in improved system efficiency, with little impact on the extent of regeneration.

Although the specific measured feature in the regeneration effluent gas that changes with time is different in these three types of regeneration (i.e., oxygen concentration, temperature, carbon dioxide concentration), the related three embodiments of the present invention share a common characteristic; they all use the effluent gas from the first reaction vessel in its later stage of regeneration for the regeneration of a second reaction vessel in its early stage of regeneration. Therefore, even if more than one type of regeneration, for example temperature and carbon dioxide concentration, takes place in reaction vessels simultaneously, as is the case in many of the hydrogen production processes disclosed in the prior art, the sequential regeneration scheme in this invention can be applied.

After the solid packing material in any of the reaction vessels has been at least partially regenerated, the introduction of the regeneration gas to the reaction vessel may be terminated. The process may then further comprise introducing feed gas comprising at least one hydrocarbon into reaction vessels containing solid packing material, reacting the at least one hydrocarbon in the reaction vessels thereby generating a product gas comprising hydrogen, and withdrawing the product gas from the reaction vessels. During the step of reacting the at least one hydrocarbon, the solid packing material may be at least partially degraded and therefore in need of subsequent regeneration.

The particular hydrocarbon or hydrocarbons in the feed gas may depend on the hydrogen production technology and is a matter of choice. The hydrocarbon may be any aliphatic, cycloaliphatic or aromatic hydrocarbon having 1 to 12 or more carbon atoms, and it may be saturated or ethylenically unsaturated and straight chain or branched chain. The hydrocarbon may comprise hydrocarbons having 1 to 4 carbon atoms. Suitable hydrocarbon substances are known in the art of hydrogen production and include, for example, methane, natural gas, methanol, ethane, ethane, propane, propene, butane, benzene, xylene, refined petroleum derivatives, such as, naphtha and gasoline, diesel and mixtures thereof.

Feed gas to the various vessels containing solid packing material may come from the same source or different sources.

Depending on the hydrogen production technology used, the feed gas may further comprise steam. Alternatively, if steam is needed in the hydrogen production technology, the process may further comprise introducing a complementary stream comprising steam. For example, steam hydrocarbon reforming requires both the introduction of a hydrocarbon and steam. The steam may be introduced together with the hydrocarbon or separately.

In the hydrogen production step, hydrocarbon is converted to hydrogen and other products. A wide range of hydrogen production technologies may be used for the hydrogen production step, including steam hydrocarbon reforming, hydrocarbon partial oxidation (both catalytic and thermal), catalytic hydrocarbon cracking, and combinations thereof. A common characteristic of these reaction systems is that during the hydrogen production step, the solid packing material is somehow degraded. For example, the solid packing material may be degraded in one or more of the following ways: the catalyst has lost its activity through changes in oxidation state or carbon deposition, the carbon dioxide fixing material has been saturated with carbon dioxide, the metal oxide material has reduced to a low oxidation state that can no longer be use for reaction, and generally the temperature of the reaction vessel has dropped too low for the reaction to continue due to the endothermicity of reaction.

The inventive process may further comprise inert gas purging of the hydrogen reaction vessels prior to and/or after introducing regeneration gas. Inert gas purge is defined herein as a purge wherein a gas is introduced to the vessel to remove one or more particular gases from the reaction vessel without affecting regeneration of the solid packing material. For example, a purge gas may be used to remove reactant and/or product gases before regeneration and/or remove one or more regeneration gas species after regeneration.

For example, where the solid packing material comprises complex metal oxide, the reaction vessel may contain combustible gases, such as hydrogen and unconverted feed gas, after the hydrogen production step. Without a purge step to remove these gases, oxygen in the oxygen-containing regeneration gas may react with the combustible gases in an uncontrollable manner, impairing the quality and safety of the operation. Inert purge gases may include water (steam), carbon dioxide, nitrogen, helium, argon and mixtures thereof. An inert purge gas comprising oxygen may be considered inert if it does not affect regeneration of the solid packing material. Suitable inert purge gases may be determined without undue experimentation. Use of steam may decrease the thermal efficiency of the process, while use of carbon dioxide, nitrogen, helium and/or argon normally increase the operating cost.

An inert gas purge may also be desirable after regeneration of the solid packing material and before introducing combustible feed gas into the reaction vessel. For example, for the case of hydrogen production technology using complex metal oxides, the reaction vessel may contain about 21% oxygen in the vessel at the end of regeneration if air is used to regenerate the complex metal oxide. The oxygen concentration may be reduced by purging the reaction vessel with inert gas, for example steam, prior to introducing combustible feed gas, thereby mitigating the risk of unwanted reactions.

In an embodiment of the current invention, the inert purge gas may comprise effluent gas from a reaction vessel undergoing regeneration. With reference again to FIGS. 1 and 2, the oxygen concentration is low during the first or early period of regeneration and may therefore be suitable and safe to use for inert gas purging. In this embodiment, the effluent gas from one reaction vessel in its early period of the regeneration step is withdrawn and used as at least a portion of the inert purge gas for a second reaction vessel in one or more purge steps. Effluent gas from a vessel undergoing regeneration may be used for purging another vessel if the combustible gas and oxygen concentrations in the effluent gas are suitable. The oxygen concentration of effluent gas from a vessel undergoing regeneration may be measured. If the cycle times of vessels are not suitably aligned, effluent from one reaction vessel in its early period of regeneration may be stored in a storage tank and at the appropriate moment used for inert gas purging.

The effluent gas from the first reaction vessel in the early stage of regeneration step may be cooled by heat exchange with a colder stream before being used as a purge gas in the second reaction vessel. This may improve energy efficiency and/or ease gas handling. The cooling may be regenerative using regenerative inert solids at the outlet end of the reaction vessel. The effluent gas may be blended with one or more additional gas streams, for example, a flue gas comprising products of combustion. Cooling schemes may also be used for the flue gas or a mixture of the effluent from a reaction vessel and flue gas before or after mixing.

The inventive process may comprise using regeneration gas effluent in both an inert gas purge step and a regeneration step. With reference again to FIG. 1, the oxygen concentration is low during the first or early period of regeneration and high during a subsequent second period. The first period effluent may be suitable for inert gas purging whilst the second period effluent may be suitable for regenerating another solid packing material.

The cost of using effluent gas may be lower than using imported inert purge gases.

Alternatively to the one or more purge steps, a regeneration gas having an oxygen concentration sufficient to affect some regeneration of the solid packing material while limiting the rise in temperature in the reaction vessel should the oxygen react with the combustible gases in the vessel may be used. The oxygen concentration in the regeneration gas may vary with time. Initially the oxygen concentration may be low and then steadily increased after combustible gases have been removed from the reaction vessel to affect better regeneration of the solid packing material. Near the end of the regeneration step, the oxygen concentration of the regeneration gas may be decreased to avoid the need for the inert gas purge after the regeneration step. Regeneration gas having low oxygen concentration may comprise effluent gas from another reaction vessel undergoing regeneration. If the cycle times of vessels are not suitably aligned, effluent gas from one reaction vessel undergoing regeneration may be stored in a storage tank and at the appropriate moment used for regeneration gas. The effluent gas may be cooled and/or blended with other gas streams.

Depending on the hydrogen production technology, the process may further comprise at least partially depressurizing the hydrogen reaction vessel. For processes where the regeneration step is operated at a substantially lower pressure than the hydrogen production step, a depressurization (also called blowdown) step may be needed between the reaction and regeneration step. For regeneration at low pressure, the purge step may be preceded or followed by a pressure reduction or blowdown step.

In case the hydrogen production and regeneration steps are operated at different pressures, the inventive process may further comprise a repressurization step in which the regenerated bed is pressurized to the reaction pressure. Repressurization may be effected by using, for example, a high pressure steam and/or hydrocarbon feed mixture. Repressurization may be combined with an inert gas purge subsequent to a regeneration step.

In another embodiment of the current invention, the feed gas has a high sulfur content, comprising at least 50 ppbv sulfur or at least 250 ppbv sulfur. The feed gas may be introduced directly to the hydrogen reaction vessel without first passing through a sulfur-removing operation. The process may further comprise depositing sulfur on the solid packing material during the hydrogen production step. Subsequently, the deposited sulfur on the solid packing material may be removed by reacting the deposited sulfur with regeneration gas to form $SO_2$. The $SO_2$ concentration in the effluent during regeneration will drop off as the deposited sulfur is consumed by reaction. The effluent gas may be formed during a first period and during a second period wherein the effluent gas during the first period has a higher $SO_2$ concentration than the effluent gas formed during the second period. As a result, the effluent gas formed during the second period may be more suitable for introducing to another hydrogen reaction vessel. Suitable hydrogen production technologies may include steam hydrocarbon reforming with or without complex metal oxide, oxygen ion conducting ceramic, and catalytic partial oxidation.

In contrast, in conventional (non-cyclic) steam hydrocarbon reforming and catalytic partial oxidation processes, sulfur needs to be removed from the hydrocarbon fuel to an acceptable level, generally less than 50 ppbv, before the fuel enters the reactor. Otherwise, sulfur will poison the catalyst, leading to shutdown of the reactor.

U.S. Pat. No. 5,827,496 to Lyon suggests that the majority of the sulfur will be retained in the reaction vessel in the reaction step such that only a minor amount of $H_2S$ will be contained in the hydrogen product gas. In cyclic processes contemplated for the current invention, the amount of sulfur deposited in a single reaction step period will be small due to the short duration of the hydrogen production step. Therefore, sulfur's impact on the catalyst activity should be slight to insignificant. The deposited sulfur will be burned off and will leave the reaction vessel as $SO_2$ during the regeneration step. As a result there should be minimal permanent accumulation of sulfur in the hydrogen reaction vessel. The sulfur ($SO_2$) in the effluent from the regeneration step may be vented or captured in a downstream subprocess if desired or necessary.

Hydrogen production technologies that have no downstream reactors, for example steam hydrocarbon reforming with complex metal oxide, are particularly suited to handle sulfur-containing feed gas. Downstream reactors, namely low or medium temperature water gas shift reactors, are especially susceptible to sulfur poisoning. Conventional hydrogen production facilities using steam hydrocarbon reforming normally include at least one downstream water gas shift reactor since the effluent gas from conventional steam hydrocarbon reforming contains significant quantities of carbon monoxide. The carbon monoxide is further reacted in the water gas shift reactor(s) with water to produce additional hydrogen and carbon dioxide. However, for steam hydrocarbon reforming with complex metal oxide in combination with a carbon dioxide acceptor, the carbon monoxide content in the reactor effluent during the reaction step is generally very low and consequently there is no need for a water gas shift reactor.

In another embodiment of the present invention, the process comprises depositing carbon on the solid packing material in one or more hydrogen reaction vessels during the step of reacting, and removing the deposited carbon by reacting regeneration gas with the deposited carbon to form carbon dioxide thereby at least partially regenerating the solid packing material. The regeneration gas may be fresh, unrecycled regeneration gas or effluent gas from another hydrogen reaction vessel produced during regeneration, where the effluent gas still contains suitable amounts of oxygen for reaction.

Traditionally, carbon deposition is avoided. For example, in a conventional noncyclic steam hydrocarbon reforming process, the carbon deposition will deactivate the reforming catalyst and carbon will accumulate in the reactor bed to the extent of completely blocking the flow through the reactor; carbon deposition is detrimental to the operation.

Depositing carbon may be suitable for the solid packing materials comprising at least one of complex metal oxide, hydrocarbon cracking catalyst, partial oxidation catalyst, and steam hydrocarbon reforming catalyst. Carbon deposition may be obtained by using low steam-to-carbon ratios and/or eliminating pre-reforming even when the feed contains heavier hydrocarbons. The steam-to-carbon ratio may be below 3, or below 2 for heavier hydrocarbon feedstock (C2 and C2+), and may be below 2.0, or below 1.5 for natural gas feedstock.

These steps of depositing carbon and burning off carbon may be particularly useful for hydrogen production technology comprising steam hydrocarbon reforming catalyst and complex metal oxide. The oxygen used in the regeneration step can burn off the carbon deposited on the catalyst during the reaction step, allowing continuous operation of the process. In a sense, this mode of operation can be viewed as running a cyclic process based on steam reforming and a cyclic process based on hydrocarbon cracking simultaneously, only the latter occurring at a very low level. If the extent of carbon deposition is controlled, running the process under the carbon deposition conditions may provide an additional parameter for the overall heat management of the process.

Figure 7:
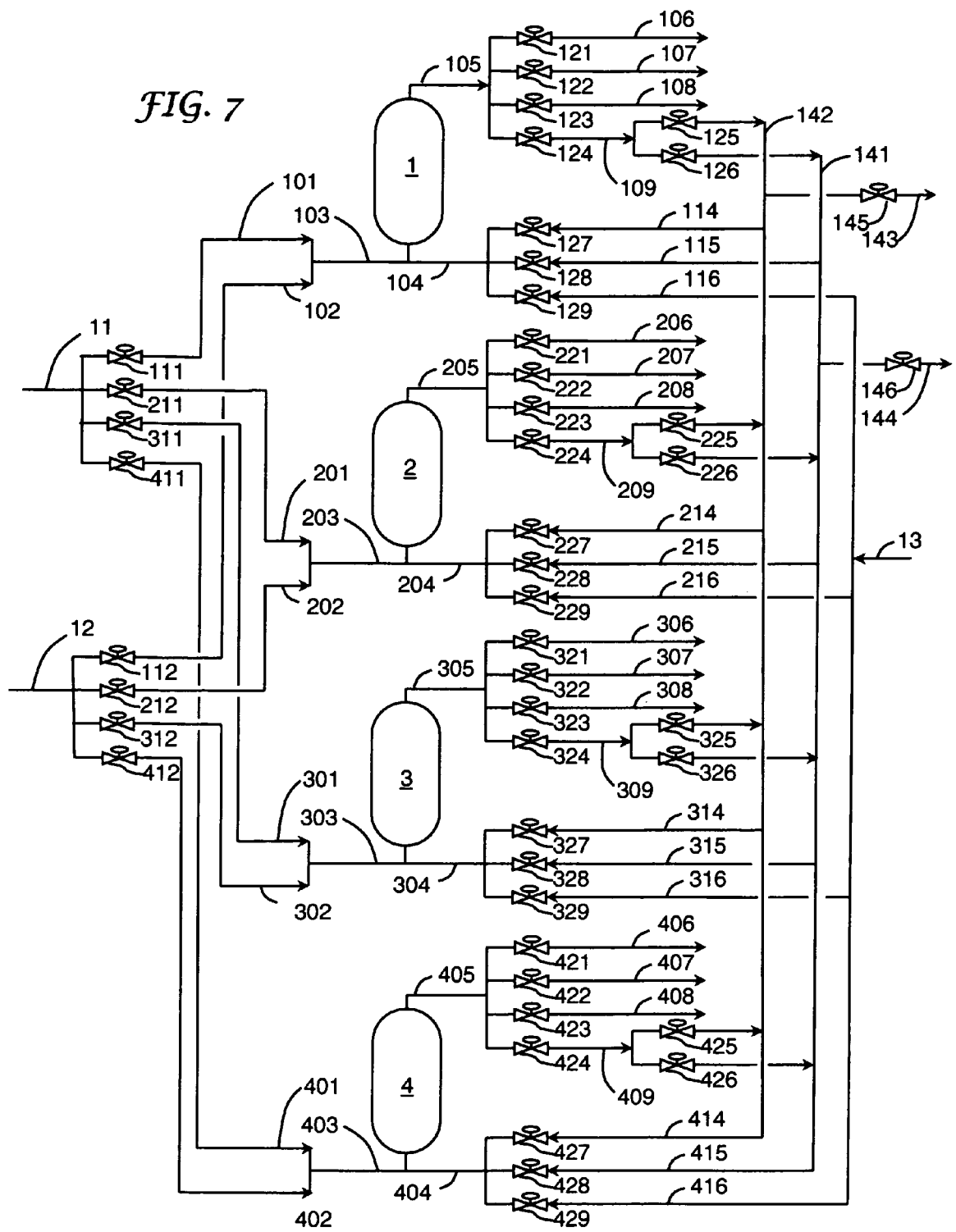
FIG. 7 is a schematic of an apparatus for performing an embodiment of the inventive process.

The generation of hydrogen from hydrocarbons and water according to an exemplary embodiment of the present invention using a complex metal oxide and a steam hydrocarbon reforming catalyst is illustrated in the schematic process diagram of FIG. 7 and cycle schedule FIG. 8. The exemplary embodiment of the present invention illustrates the present invention but does not limit the invention to any of the specific details described therein.

The exemplary embodiment shows four hydrogen reaction vessels, 1, 2, 3, and 4. Each hydrogen reaction vessel may be operated in the following exemplary sequence of steps:

(a) A production step—in which a feed mixture of hydrocarbon and steam is introduced into the reaction vessel at the appropriate temperature and pressure. The reactor bed may include preheat and post cooling zones. The reaction vessel contains a mixture of complex metal oxide and steam-hydrocarbon reforming catalyst. The gaseous feed mixture reacts with the complex metal oxide in the presence of the steam-hydrocarbon reforming catalyst in an autothermal reaction to yield hydrogen and a "spent" solid comprising metal carbonate and reduced oxide. The reactor effluent contains a mixture of hydrogen and steam, along with a small amount of reaction products including carbon dioxide, carbon monoxide, and unreacted methane. The effluent mixture is at elevated temperatures and pressure. The reaction is carried out until much of the complex metal oxide in the bed is reduced, at which time the bed is saturated with carbon dioxide and depleted of oxygen. The temperatures in the reactor and the reactor effluent temperature may vary with time during the hydrogen production step. The hydrogen production step may be characterized by a production temperature that is defined as the time-averaged temperature of the reactor effluent during the production step. The production step may be characterized by a production pressure defined as the time-averaged pressure of the reactor effluent stream.

(b) An optional inert gas purge step (abbreviated P in FIG. 8)—in which the at least partially saturated or spent bed is first purged with an inert purge gas. Suitable inert purge gases contain low concentrations of oxygen or other oxidants, for example steam, nitrogen, products of combustion, effluent from another hydrogen reaction vessel during regeneration, oxygen-depleted air, and mixtures thereof. When steam is used as the purge gas, the process effluent consists largely of steam and hydrogen, which can be recycled to the production step of another reaction vessel. The purge gas pressure is preferably close to atmospheric pressure, however, if the purge gas is steam, it can be either low or high pressure, as high pressure steam is used as a component of the feed mixture for other beds in the production step. For purging at low pressure, the purge step is preceded by a pressure reduction or blowdown step (abbreviated BD in FIG. 8). For purging at high pressure, the purge step precedes the depressurization or blowdown step.

(c) A regeneration step—in which the reaction bed is regenerated with elevated temperature oxygen-containing gas, at ambient pressure. The bed should be sufficiently purged of combustible gases to allow the safe introduction of oxygen-containing gas. Suitable oxygen-containing gases include hot air and effluent gas from another hydrogen reaction vessel during regeneration having an oxygen concentration able to affect regeneration. Alternatively, a large excess of air may be co-fired with fuel to generate an oxygen-containing flue gas mix in a direct-firing process. The regeneration step strips the bed of carbon dioxide and recharges it with oxygen so that the bed is prepared to undergo a future hydrogen production step. The temperatures in the hydrogen reaction vessel and the reaction vessel effluent temperature may vary with time during the regeneration step. The oxygen concentration of the effluent leaving the reaction vessel may vary with time during the regeneration step. The regeneration step may be divided into two periods: the first period characterized as having a relatively low time-averaged effluent oxygen concentration and the second period having a relatively high time-averaged effluent oxygen concentration. The first period is illustrated in FIG. 8 as Regen 1 and the second period as Regen 2. The regeneration step may be characterized by a regeneration temperature that is defined as the time-averaged temperature of the reactor effluent during the regeneration step. A purge step optionally may follow the regeneration step.

(d) A repressurization step (abbreviated R in FIG. 8)—in which the regenerated bed is pressurized to the reaction pressure. Repressurization may be effected by using, for example, high pressure steam or a steam/hydrocarbon feed mixture.

The term "complex metal oxide" is defined herein as a chemical compound comprising oxygen and two or more elements that are regarded as metals in their pure unoxidized state at normal ambient conditions. Complex metal oxides may include, for example, ternary or quaternary metal oxides comprising two and three metallic elements, respectively, in combination with oxygen. In contrast to a complex metal oxide, a simple metal oxide is a combination of only one element and oxygen and is usually referred to as a binary oxide. This distinction between complex and simple oxides is further explained with specific illustrations in Comprehensive Inorganic Chemistry, Vol. 2, pp. 729-735, Pergamon Press (1975).

Suitable complex metal oxide materials include oxides comprising two or more metallic elements with the general formula $A_xB_yO_n$ wherein A is at least one metallic element having an oxidation state ranging from +1 to +3, inclusive, wherein the metallic element is capable of forming a metal carbonate; x is a number from 1 to 10, inclusive; B is at least one metallic element having an oxidation state ranging from +1 to +7 inclusive, wherein B can be the same element in at least two different oxidation states; y is a number from 1 to 10 inclusive; and n represents a value such that the complex metal oxide is rendered electrically neutral. The carbonate of the metallic element A may be formed by reaction of an oxide of the element with carbon dioxide wherein the oxide of the element may be formed by reaction of the element with oxygen of water.

The complex metal oxide material may be of a formula $A_xB_yO_n$ wherein A is at least one metallic element selected from the group consisting of elements of Groups 1, 2, and 3, and the Lanthanide elements of the IUPAC Periodic Table of the Elements, and B is at least one metallic element selected from the group consisting of elements of Groups 4 to 15 of the IUPAC Periodic Table of the Elements. For example, B may be selected from the group consisting of vanadium, chromium, manganese, iron, cobalt, copper, nickel, and mixtures thereof. Component B may comprise one or more metallic elements, each of which can form oxides having at least two different valencies. The metallic element may be selected from the group consisting of vanadium, manganese, iron, cobalt, nickel, and copper. During the hydrogen gas production step, at least one of the metallic species of component B may be reduced to the metallic zero valence state. Metallic species of component B which may be reduced to the metallic state during the hydrogen production step include, but are not limited to, iron, cobalt, nickel, and copper.

Examples of specific complex metal oxides include $Ca_2CO_2O_5$, $Ca_2FeMnO_5$, $Ca_2Fe_2O_5$, $CaMnO_3$, $Ca_2Mn_2O_5$, and $CaMgFeMnO_5$. The complex metal oxides may be doped with Pt, Pt/ZrO2, Ni and/or NiO.

Preparation of complex metal oxides is known in the art. For example, complex metal oxides for steam hydrocarbon reforming may be prepared via the carbonate precursor method as described by K. Vidyasagar et al. "A Convenient Route for the Synthesis of Complex Oxides Employing Solid-Solution Precursors," in Inorganic Chem. (23), 1984, 1206-1210.

Suitable conventional steam-hydrocarbon reforming process catalysts are known in the art and include any materials effective for the reforming of methane or higher hydrocarbons with steam to produce hydrogen. For example, such materials may comprise one or more components selected from nickel, cobalt, iron, copper, any of the platinum group metals (i.e., ruthenium, osmium, rhodium, palladium, platinum, and iridium), and oxides of the foregoing, supported on zirconia, alumina and other suitable supports. Exemplary steam-hydrocarbon reforming process catalysts include, but are not limited to, 1% platinum on a zirconium oxide support, 1% platinum on an alumina support, and 4% rhodium on a lithium aluminate support. If the steam-hydrocarbon reforming catalyst is a supported nickel oxide or cobalt oxide material, for example, it may be necessary to at least partially reduce the oxide to the metal or to activate the oxide with a feed of methane containing about 3% hydrogen. When this occurs in conjunction with the hydrogen production step (a), the catalyst material partly behaves like a redoxide itself, furnishing oxygen shifting capacity and functionality. For example, if the catalyst is NiO, it will be reduced to Ni during the production step, thereby acting as an SMR catalyst. During the regeneration step, the catalyst will be reduced to NiO thereby functioning as an oxygen carrier. This dual functionality may not be present for noble metal catalysts such as Pt and Rh.

Referring again to FIG. 7, a heated hydrocarbon-containing feed gas, for example, methane, natural gas, or pre-reformed natural gas, flows via conduit 11 at a pressure in the range of 200 to 800 psia and a temperature in the range of about 200° C. to 250° C. The feed gas may be preheated in a heat exchanger (not shown). Feed gas flows through open valve 111 to conduit 101 and process steam flows via conduit 12 through open valve 112 to conduit 102. Feed gas is mixed with process steam to form a hydrocarbon-steam feed mixture which flows via conduit 103 to hydrogen reaction vessel 1. Hydrogen reaction vessels may be constructed by means and materials known in the art. When the hydrocarbon is methane or pre-reformed natural gas, the molar ratio of steam to hydrocarbon may be from about 1:1 to about 4:1, and typically may be about 2:1. The molar steam to carbon ratio may be higher, and may range up to about 20:1 for heavier hydrocarbons.

The steam-hydrocarbon mixture is introduced into a heat exchanger (not shown) and is further heated therein by heat exchange with a hot process stream. The steam-hydrocarbon mixture may be heated to a temperature in the range of about 350° C. to about 900° C., and typically may be in the range of about 600° C. to about 750° C. The heated mixture then is introduced via conduit 103 into reactor 1, which contains a bed containing a mixture of complex metal oxide material and a steam-hydrocarbon reforming catalyst. The feed mixture reacts in the bed to form primarily hydrogen and a spent solid comprising a reduced oxide-carbonate.

The inventory of chemically bound oxygen available as reactants, i.e., the oxygen associated with the complex metal oxide and steam reactants, may be adjusted in the reactor design so that the reaction product effluent stream leaves reactor 1 via conduit 105 at a time-averaged temperature between about 400° C. and about 750° C. The reaction product effluent stream flows through open valve 121 and via conduit 106 to a heat exchanger (not shown), where it is cooled to a temperature in the range of about 250° C. to about 350° C. by indirect heat exchange with an incoming steam-hydrocarbon mixture stream as earlier described. The cooled reaction product effluent stream exits a heat exchanger in heat exchange relationship with incoming feed gas (not shown)

and is further cooled in heat exchangers and/or boilers to yield a further cooled reaction product effluent stream at a typical temperature of about 40° C.

The cooled reaction product stream may be further purified by pressure swing adsorption (PSA). Components removed from the hydrogen by the PSA system typically include carbon dioxide, water, methane and other unreacted hydrocarbons, and carbon monoxide, and these are withdrawn as waste gas during the blowdown and purge steps typically used in PSA process cycles. Any of the PSA cycles and systems known in the art may be used in the process described in this and other embodiments of the invention. The waste gas typically contains combustible components and may be used as fuel in the plant.

The mixture of complex metal oxide material and steam-hydrocarbon reforming catalyst in reactor 1 has a finite inventory of chemically bound oxygen and a finite chemisorption capacity for carbon dioxide as the reduced oxide-carbonate. Once either of these is exhausted, the purity and yield of hydrogen in the reaction product effluent stream leaving reactor 1 via conduit 105 and 106 will begin to decrease. The time at which this occurs can be determined by real-time analysis of the stream by any known analytical means, such as, for example, in-line gas chromatography, or by a pre-determined cycle time. At this point, reactor 1 is prepared for regeneration. The flow of feed gas and steam is stopped by closing valves 111 and 112. The flow of product gas is stopped by closing valve 121 and the vessel is depressurized by opening valve 122, allowing the blowdown gas to flow via conduit 107. The blowdown gas may be used as a fuel, for example in a boiler (not shown).

Valve 122 for blowdown effluent is then closed and valve 123 for purge effluent is opened and reactor 1 is purged with a suitable purge gas such as effluent from another reaction vessel undergoing regeneration, steam or nitrogen to remove residual hydrocarbons from the reactor void volume. Referring to FIG. 8, reactor 4 will be in its first period of regeneration when the oxygen concentration will be low and the effluent of the reactor 4 suitable as a purge gas. Effluent from reaction vessel 4, leaving through conduit 405, will flow through open valve 424, through conduit 409, through open valve 425, through conduit 142, through conduit 114, through open valve 127, through conduit 104 and into reaction vessel 1. After the purge with regeneration gas effluent, valve 127 is closed and valve 145 is opened for the regeneration effluent gas to flow through conduit 143 to another part of the process to be used possibly as a fuel. Alternatively, if steam is the desired purge gas, steam for purge may be provided via conduit 102 by opening valve 112, and steam flows through conduit 103 into the reaction vessel 1. Purge effluent gas leaves reactor 1 via conduit 105, valve 123 and conduit 108. From conduit 108, the purge effluent gas may be used as a fuel with or without additional heat exchange.

FIG. 7 shows an arrangement where feed, blowdown, purge, and regeneration gases all flow upward in the reaction vessel. Other arrangements of valves and conduits may allow one or more of these gases to flow downward in the reaction vessel. For example, the feed gas and regeneration gas may flow in opposite direction within the bed.

Regeneration of reactor 1 is initiated by closing valve 123 and opening previously-closed valve 124 and valve 125. Valve 126 remains closed. According to FIG. 8, reaction vessel 3 will be in a second period of regeneration where the effluent will contain relatively higher concentrations of oxygen. Air at about 15 to 50 psia and 500° C. to 900° C. or about 700° C. to 800° C., is provided via conduit 13, through conduit 316, valve 329, conduit 304 and into reaction vessel 3.

Regeneration gas effluent from reaction vessel 3 during the second period of regeneration exits through conduit 305, through open valve 324, conduit 309, open valve 326 and into conduit 141. From conduit 141, regeneration gas effluent from reaction vessel 3 flows through conduit 115, valve 128, conduit 104 and into reaction vessel 1. The oxygen in the regeneration gas effluent regenerates the complex metal oxide material, and the regeneration gas desorbs the previously chemisorbed carbon dioxide. The carbon-dioxide-rich, oxygen-depleted regeneration offgas leaves the reactor via conduit 105 at a temperature in the range of about 600° C. to about 900° C. and typically from about 650° C. to about 750° C. The oxygen-depleted regeneration offgas then flows through open valve 124, conduit 109, open valve 125, conduit 142, open valve 145, and conduit 143. From conduit 143, the gas may be introduced into various heat exchangers (not shown) to recover heat.

As reaction vessel 3 completes the regeneration step, valves 326 and 128 are closed. Fresh regeneration gas from conduit 13 is introduced to reaction vessel 1 via conduit 116, open valve 129, and conduit 104. Carbon-dioxide-rich, oxygen-depleted regeneration offgas leaves the reactor via conduit 105 then flows through open valve 124, conduit 109, open valve 125, conduit 142, open valve 145, and conduit 143. From conduit 143, the gas may be introduced into various heat exchangers to recover heat. According to FIG. 8, a portion of the carbon-dioxide-rich, oxygen-depleted regeneration offgas from reaction vessel 1 may be used to purge reaction vessel 2. Carbon-dioxide-rich, oxygen-depleted regeneration offgas from reaction vessel 1 flows through conduit 142, conduit 214, open valve 227, conduit 204 and into reaction vessel 2. After purging vessel 2, valve 227 is closed.

As shown in FIG. 2, after a period of time, the oxygen concentration in the regeneration gas effluent from vessel 1 will increase. An in-line oxygen sensor or equivalent device (not shown) may be included in conduit 109 to measure the concentration of oxygen leaving vessel 1. Valves 125 and 126 may be open or closed depending on the oxygen concentration measured in conduit 109. Alternatively, the opening and closing of valves 125 and 126 may be timed to coincide with the transition from low oxygen concentration to high concentration of oxygen. During the first regeneration period, relatively low oxygen concentration effluent flows through open valve 125 into conduit 142. During the second regeneration period, relatively high oxygen concentration effluent flows through open valve 126 into conduit 141. The oxygen concentration where the effluent flow switches between valve 125 or 126 is a matter of design choice.

Regeneration gas effluent from vessel 1 during the second period contains sufficient oxygen for regenerating another bed at the beginning of regeneration. According to FIG. 8, vessel 3 starts to regenerate while vessel 1 is in the second period of regeneration. At this point in the cycle, regeneration gas effluent from vessel 1 flows through open valve 126 to conduit 141, through conduit 315, valve 328, through conduit 304 and into vessel 3.

Following the substantial regeneration of reactor 1 by re-oxidizing the complex metal oxide and removal of chemisorbed carbon dioxide, the reaction vessel may be purged with an inert gas and repressurized with steam, feed gas, or product gas. Following repressurization, the reaction vessel proceeds to the production step and the cycle is repeated as described earlier.

Reaction vessels 2, 3, and 4 are operated through the same cycle steps described above for reaction vessel 1, but the cycles are staggered as shown in FIG. 8, so that they operate to provide a continuous supply of hydrogen-enriched product gas.

At the appropriate time, hydrocarbon-containing feed gas flows via valves 111, 211, 311, and 411 to conduits 101, 201, 301, and 401, respectively. Steam is added via valves 112, 212, 312, and 412 to conduits 102, 202, 302, and 402, respectively.

At the appropriate time according the cycle schedule in FIG. 8, feed gas from conduit 101 is mixed with steam from conduit 102 to form a hydrocarbon-steam feed mixture which flows via conduit 103 to hydrogen reaction vessel 1. Feed gas from conduit 201 is mixed with steam from conduit 202 to form a hydrocarbon-steam feed mixture which flows via conduit 203 to hydrogen reaction vessel 2. Feed gas from conduit 301 is mixed with steam from conduit 302 to form a hydrocarbon-steam feed mixture which flows via conduit 303 to hydrogen reaction vessel 3. Feed gas from conduit 401 is mixed with steam from conduit 402 to form a hydrocarbon-steam feed mixture which flows via conduit 403 to hydrogen reaction vessel 4.

Effluent from reaction vessels 1, 2, 3, and 4 flows through conduits 105, 205, 305, and 405, respectively and is routed according to the vessels' cycle step. Hydrogen-enriched product gas from reaction vessels 1, 2, 3, and 4 is fed through valves 121, 221, 321, and 421, respectively to conduits 106, 206, 306 and 406, respectively. During depressurization, blowdown gas from reaction vessels 1, 2, 3, and 4 is fed through open valves 122, 222, 322, and 422, respectively to conduits 107, 207, 307, and 407, respectively. During purging, purge gas effluent from reaction vessels 1, 2, 3, and 4 is fed through valves 123, 223, 323, and 423, respectively to conduits 108, 208, 308, and 408, respectively. During regeneration, regeneration gas effluent from reaction vessels 1, 2, 3, and 4 is fed through valves 124, 224, 324, and 424, respectively to conduits 109, 209, 309, and 409, respectively.

Regeneration gas effluent from reaction vessels 1, 2, 3, and 4 during a first period having low oxygen concentration flows through valves 125, 225, 325, and 425, respectively to conduit 142. Regeneration gas effluent from reaction vessels 1, 2, 3, and 4 during a second period having high oxygen concentration flows through valves 126, 226, 326, and 426, respectively to conduit 141. An additional set of valves and conduits may be provided if it is desired to segment more than two oxygen concentrations.

During an initial phase of regeneration of reaction vessels 1, 2, 3, and 4, regeneration gas is introduced via conduit 141, which contains regeneration gas effluent from another of the reaction vessels at a later phase of regeneration. Regeneration gas effluent from conduit 141 flows via conduits 115, 215, 315, and 415, respectively, valves 128, 228, 328, and 428 respectively, and conduits 104, 204, 304, and 404, respectively, to reaction vessels 1, 2, 3, and 4, respectively. Subsequent to the introduction of regeneration gas effluent from another reaction vessel, fresh regeneration gas is fed via conduits 116, 216, 316 and 416, valves 129, 229, 329, and 429, respectively, and conduits 104, 204, 304, and 404, respectively, to reaction vessels 1, 2, 3, and 4. The regeneration gas effluent may also be blended with fresh regeneration gas from conduit 13.

Purge gas may be provided from steam via conduit 12 or regeneration gas effluent having low oxygen concentration via conduit 142. For the case where the purge gas is steam, steam flows through open valves 112, 212, 312, and 412, through conduits 102, 202, 302, and 402, respectively, through conduits 103, 203, 303, and 403, respectively to reaction vessels 1, 2, 3, and 4, respectively. For the case where the purge gas is regeneration gas effluent from another vessel, the purge gas flows via conduit 142 through conduits 114, 214, 314, and 414, through valves 127, 227, 327 and 427, respectively, through conduits 104, 204, 304, and 404, respectively, to reaction vessels 1, 2, 3, and 4, respectively.

In FIG. 8, the sequence steps are further broken down into segments. A summary of open valves for each corresponding segment (A-Q) is given in FIG. 9. Open valves in FIG. 9 correspond to the case where regeneration gas effluent is used as a purge gas. Reaction vessels 1 through 4 thus are operated in a staggered sequence between the hydrogen production and regeneration modes by the proper operation of switch valves according to FIG. 9.

Although detailed using a system having 4 reaction vessels, any suitable number of reaction vessels in parallel may be used in staggered operation to achieve continuous hydrogen production. In practice, the duration of the hydrogen production step using a particular complex metal oxide may be different than the duration of the regeneration step. For example, if the regeneration step is twice as long as the production step, a configuration employing three parallel beds may be advantageously used wherein two beds are being regenerated while the third bed is used for hydrogen production.

Although described in detail for a hydrogen production technology using metal oxides, the invention may be readily applied to other hydrogen production technologies requiring regeneration, including those described in U.S. Pat. No. 5,827,496 to Lyon, U.S. Pat. No. 6,682,838 to Stevens, U.S. patent application Ser. No. 10/771,919 by Hershkowitz et al., U.S. Pat. No. 6,767,530 to Kobayashi et al., U.S. Pat. No. 6,761,838 to Zeng et al. and U.S. Pat. No. 6,506,510 to Sioui et al., for example Other embodiments and benefits of the invention will be apparent to those skilled in the art from a consideration of this specification or from practice of the invention disclosed herein. It is intended that this specification be considered as exemplary only with the true scope and spirit of the invention being indicated by the following claims.

The invention claimed is:

1. A process for producing a hydrogen-containing gas comprising:
   introducing a first feed gas comprising at least one hydrocarbon into a first hydrogen reaction vessel containing a first solid packing material;
   reacting the at least one hydrocarbon in the first hydrogen reaction vessel thereby generating a first product gas comprising hydrogen and thereby at least partially degrading the first solid packing material;
   withdrawing the first product gas from the first hydrogen reaction vessel;
   introducing a first regeneration gas into the first hydrogen reaction vessel thereby at least partially regenerating the first solid packing material and forming a first effluent gas from the first regeneration gas; and
   introducing at least a portion of the first effluent gas into a second hydrogen reaction vessel containing a second solid packing material thereby at least partially regenerating the second solid packing material with the at least a portion of the first effluent gas.

2. The process of claim 1 further comprising:
   introducing a second feed gas comprising the at least one hydrocarbon into the second hydrogen reaction vessel;
   reacting the at least one hydrocarbon in the second hydrogen reaction vessel thereby generating a second product gas comprising hydrogen and thereby at least partially degrading the second solid packing material; and withdrawing the second product gas from the second hydrogen reaction vessel.

3. The process of claim 1 further comprising introducing a first complementary feed gas comprising steam into the first hydrogen reaction vessel.

4. The process of claim 1 wherein the first feed gas further comprises steam.

5. The process of claim 1 wherein the first feed gas further comprises at least 50 ppbv sulfur and further comprising depositing sulfur onto the first solid packing material.

6. The process of claim 5 further comprising removing sulfur from the first solid packing material by reacting the first regeneration gas with the sulfur to form $SO_2$.

7. The process of claim 6 wherein the first effluent gas is formed during a first period and during a second period, wherein the first effluent gas formed during the first period has a higher $SO_2$ concentration than the first effluent gas formed during the second period; and
   wherein the at least a portion of the first effluent gas introduced into the second hydrogen reaction vessel is formed during the second period.

8. The process of claim 1 wherein:
   at least partially degrading the first solid packing material comprises depositing carbon on the first solid packing material during the step of reacting the at least one hydrocarbon in the first hydrogen reaction vessel; and
   wherein at least partially regenerating the first solid packing material comprises removing the deposited carbon on the first solid packing material by reacting the first regeneration gas with the deposited carbon to form carbon dioxide.

9. The process of claim 2 wherein at least partially degrading the second solid packing material comprises depositing carbon on the second solid packing material during the step of reacting the at least one hydrocarbon in the second hydrogen reaction vessel; and further comprising removing the deposited carbon on the second solid packing material by reacting the at least a portion of the first effluent gas with the deposited carbon on the second solid packing material to form carbon dioxide.

10. The process of claim 1 further comprising introducing a second regeneration gas into the second hydrogen reaction vessel thereby at least partially regenerating the second solid packing material and forming a second effluent gas from the second regeneration gas and wherein the second regeneration gas comprises at least a portion of the first effluent gas.

11. The process of claim 10 further comprising:
    purging a third hydrogen reaction vessel containing a third solid packing material with the at least a portion of the first effluent gas to displace combustible components from the third hydrogen reaction vessel; and
    withdrawing a purge gas effluent from the third hydrogen reaction vessel.

12. The process of claim 11 wherein the first effluent gas is formed during a first period and during a second period which is subsequent to the first period,
    wherein the at least a portion of the first effluent gas used during the step of purging the third hydrogen reaction vessel is formed during the first period, and
    wherein the at least a portion of the first effluent gas used during the step of at least partially regenerating the second solid packing material is formed during the second period.

13. The process of claim 10 further comprising introducing the second effluent gas into a third vessel containing a third solid packing material.

14. The process of claim 1 further comprising:
    purging the second hydrogen reaction vessel with the at least a portion of the first effluent gas to displace combustible components from the second hydrogen reaction vessel; and
    withdrawing a purge gas effluent from the second hydrogen reaction vessel.

15. The process of claim 1 further comprising:
    purging the first hydrogen reaction vessel with a first purge gas to displace combustible components from the first hydrogen reaction vessel; and
    withdrawing a purge gas effluent from the first hydrogen reaction vessel.

16. The process of claim 15 further comprising:
    prior to purging the first hydrogen reaction vessel, at least partially depressurizing the first hydrogen reaction vessel; and
    withdrawing a depressurization gas from the first hydrogen reaction vessel.

17. The process of claim 1 wherein at least partially regenerating the first solid packing material comprises reacting oxygen contained in the first regeneration gas with the first solid packing material.

18. The process of claim 1 further comprising reacting an oxygen-containing gas with a fuel thereby forming at least a portion of the first regeneration gas.

19. The process of claim 1 wherein at least partially regenerating the first solid packing material comprises reacting a fuel and oxygen thereby heating the first solid packing material.

20. The process of claim 1 wherein at least one of the first solid packing material and the second solid packing material comprises at least one of a complex metal oxide, a steam hydrocarbon reforming catalyst, an oxygen ion conducting ceramic, a hydrocarbon partial oxidation catalyst, and a hydrocarbon cracking catalyst.

21. The process of claim 1 wherein at least one of the first hydrogen reaction vessel and the second hydrogen reaction vessel further comprise at least one of a carbon dioxide fixing material and a refractory solid for regenerative heat exchange.

22. The process of claim 1 further comprising reacting at least a portion of the first effluent gas with a fuel in a combustor.

23. The process of claim 1 wherein the first regeneration gas comprises oxygen, the process further comprising:
    introducing a first complementary regeneration gas comprising a first fuel; and
    reacting at least a portion of the first fuel with only a portion of the oxygen in the first regeneration gas thereby heating the first solid packing material thereby at least partially regenerating the first solid packing material and forming the first effluent gas comprising unreacted oxygen from the first regeneration gas.

24. The process of claim 23 further comprising
    introducing a second complementary regeneration gas comprising a second fuel into the second hydrogen reaction vessel; and
    reacting at least a portion of the second fuel with at least a portion of the unreacted oxygen in the at least a portion of the first effluent gas introduced into the second hydrogen reaction vessel thereby heating the second solid packing material thereby at least partially regenerating the second solid packing material.

25. A process for producing a hydrogen-containing gas comprising:
- (a) introducing a first feed gas comprising at least one hydrocarbon and steam into a first hydrogen reaction vessel containing a first solid packing material comprising a complex metal oxide and a steam-hydrocarbon reforming catalyst;
- (b) reacting the first feed gas in the first hydrogen reaction vessel thereby generating a first product gas comprising hydrogen and thereby at least partially degrading the first solid packing material;
- (c) withdrawing the first product gas from the first hydrogen reaction vessel;
- (d) terminating the introduction of the first feed gas;
- (e) introducing a first regeneration gas comprising oxygen into the first hydrogen reaction vessel thereby at least partially regenerating the complex metal oxide in the first hydrogen reaction vessel and forming a first effluent gas from the first regeneration gas;
- (f) introducing a second feed gas comprising at least one hydrocarbon and steam into a second hydrogen reaction vessel containing a second solid packing material comprising the complex metal oxide and the steam-hydrocarbon reforming catalyst;
- (g) reacting the second feed gas in the second hydrogen reaction vessel thereby generating a second product gas comprising hydrogen and thereby at least partially degrading the second solid packing material;
- (h) withdrawing the second product gas from the second hydrogen reaction vessel;
- (i) terminating the introduction of the second feed gas;
- (j) introducing a second regeneration gas comprising the first effluent gas into the second hydrogen reaction vessel thereby at least partially regenerating the complex metal oxide in the second hydrogen reaction vessel; and
- (k) repeating (a) through (j) in a cyclic manner.

* * * * *